(12) United States Patent
Polivka

(10) Patent No.: US 9,584,027 B2
(45) Date of Patent: Feb. 28, 2017

(54) POWER CONVERTER WITH WINDING COMMUNICATION

(71) Applicant: Power Integrations, Inc., San Jose, CA (US)

(72) Inventor: William M. Polivka, Campbell, CA (US)

(73) Assignee: Power Integrations, Inc., San Jose, CA (US)

( * ) Notice: Subject to any disclaimer, the term of this patent is extended or adjusted under 35 U.S.C. 154(b) by 49 days.

(21) Appl. No.: 14/684,002

(22) Filed: Apr. 10, 2015

(65) Prior Publication Data

US 2016/0301314 A1    Oct. 13, 2016

(51) Int. Cl.
*H02M 3/335*    (2006.01)

(52) U.S. Cl.
CPC ... *H02M 3/33507* (2013.01); *H02M 3/33592* (2013.01)

(58) Field of Classification Search
CPC ............. H02M 3/33507; H02M 3/335; H02M 3/33576; H02M 3/33592; H02M 3/33569; H02M 3/33523; H02M 3/33515; H02M 3/1588; H02M 3/33546; H02M 2001/0009; H02M 1/08
See application file for complete search history.

(56) References Cited

U.S. PATENT DOCUMENTS

| | | | |
|---|---|---|---|
| 5,986,895 A * | 11/1999 | Stewart | H02M 3/337 363/131 |
| 7,876,583 B2 | 1/2011 | Polivka et al. | |
| 8,000,115 B2 | 8/2011 | Polivka et al. | |
| 8,125,799 B2 * | 2/2012 | Zhu | H02M 3/33523 363/21.12 |
| 8,243,477 B2 | 8/2012 | Polivka et al. | |
| 8,873,254 B2 | 10/2014 | Morris et al. | |
| 2008/0247202 A1 * | 10/2008 | Djenguerian | H02M 3/24 363/78 |
| 2009/0284989 A1 * | 11/2009 | Sato | H02M 3/33592 363/19 |
| 2010/0157630 A1 * | 6/2010 | Polivka | H02M 3/33523 363/21.16 |
| 2012/0281439 A1 | 11/2012 | Polivka et al. | |
| 2014/0133191 A1 * | 5/2014 | Wang | H02M 3/33576 363/21.08 |

(Continued)

*Primary Examiner* — Gustavo Rosario Benitez
(74) *Attorney, Agent, or Firm* — Blakely Sokoloff Taylor & Zafman LLP

(57) ABSTRACT

A power converter includes an energy transfer element, a switched element, a secondary control circuit, a primary switching, and a primary control circuit. The secondary control circuit generates a voltage pulse across a secondary winding of the energy transfer element while the secondary winding provides current to an output. The secondary control circuit is coupled to vary a voltage across the switched element to generate the voltage pulse across the secondary winding in response to an output of the power converter. The primary control circuit is coupled to the primary switch and a third winding of the energy transfer element. The primary control circuit is coupled to switch the primary switch to regulate the output in response to the voltage pulse. The secondary winding is coupled to reflect the voltage pulse onto the third winding which is on the same side of the energy transfer element as a primary winding.

27 Claims, 10 Drawing Sheets

(56) References Cited

U.S. PATENT DOCUMENTS

| 2014/0268901 | A1 | 9/2014 | Telefus | |
|---|---|---|---|---|
| 2015/0124495 | A1* | 5/2015 | Kong | H02M 3/33592 |
| | | | | 363/21.14 |
| 2015/0280584 | A1* | 10/2015 | Gong | H02M 3/33515 |
| | | | | 363/21.13 |
| 2016/0028313 | A1* | 1/2016 | Kong | H02M 3/33507 |
| | | | | 363/21.12 |

* cited by examiner

POWER CONVERTER WITH WINDING COMMUNICATION

TECHNICAL FIELD

This disclosure relates generally to power converters and, more specifically, to ac-dc and/or dc-dc switched mode power converters.

BACKGROUND INFORMATION

Many electrical devices, such as cell phones, personal digital assistants (PDA's), laptops, etc., use power to operate. Because power is generally delivered through a wall socket as high voltage alternating current (ac), a device, typically referred to as a power converter, can be used to transform the high voltage ac input to a well regulated direct current (dc) output through an energy transfer element. Switched mode power converters are commonly used due to their high efficiency, small size, and low weight to power many of today's electronics. In a typical operation, a switched mode power converter uses a switch to provide the desired output quantity by either varying the duty ratio (typically the ratio of the on-time of the switch to the total switching period) or by varying the switching frequency of the switch. Among the various switched mode power converter topologies, a flyback converter is a commonly used topology for low-cost power converters. In a typical application, the ac-dc power converter receives an input from an ordinary ac electrical outlet. The output of the power converter is typically a dc voltage, but may be a regulated dc current for applications such as charging batteries.

Safety agencies generally require the power converter to provide galvanic isolation between input and output. Galvanic isolation prevents dc current between input and output of the power converter. In other words, a dc voltage applied between an input terminal and an output terminal of the power converter will produce no substantial dc current between the input terminal and the output terminal of the power converter. The requirement for galvanic isolation may be a complication that contributes to the cost of the power converter.

A power converter with galvanic isolation maintains an isolation barrier that electrically separates the input from the output. Energy is transferred across the isolation barrier to provide power to the output, and information in the form of signals is transferred across the isolation barrier to regulate the output. Galvanic isolation is typically achieved with electromagnetic and electro-optical devices. Electromagnetic devices such as transformers and coupled inductors are generally used to transfer energy from input to output to provide output power, whereas electro-optical devices are generally used to transfer signals from output to input to control the transfer of energy from input to output.

Efforts to reduce the cost of the power converter have focused on the elimination of electro-optical devices and their associated circuits. Alternative solutions generally use an energy transfer element such as a transformer or a coupled inductor to provide energy to the output and also to obtain the information necessary to control the output. One low cost configuration places the control circuit and a high voltage switch on the input side of the isolation barrier. The controller obtains information about the output indirectly from observation of a voltage at a winding of the energy transfer element. The winding that provides the information is also on the input side of the isolation barrier.

The information about the output received in an indirect manner as described above is based substantially on the magnetic coupling between the windings placed on the input and the output sides of the energy transfer element. The magnetic coupling between the windings may not be perfect due to physical and mechanical limitations associated with the placement of the windings of the energy transfer element. This may lead to inaccurate information about the output which may further lead to poor regulation of the output. Therefore, generating more reliable information about the output would improve regulation of power converter outputs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

Figure 1:
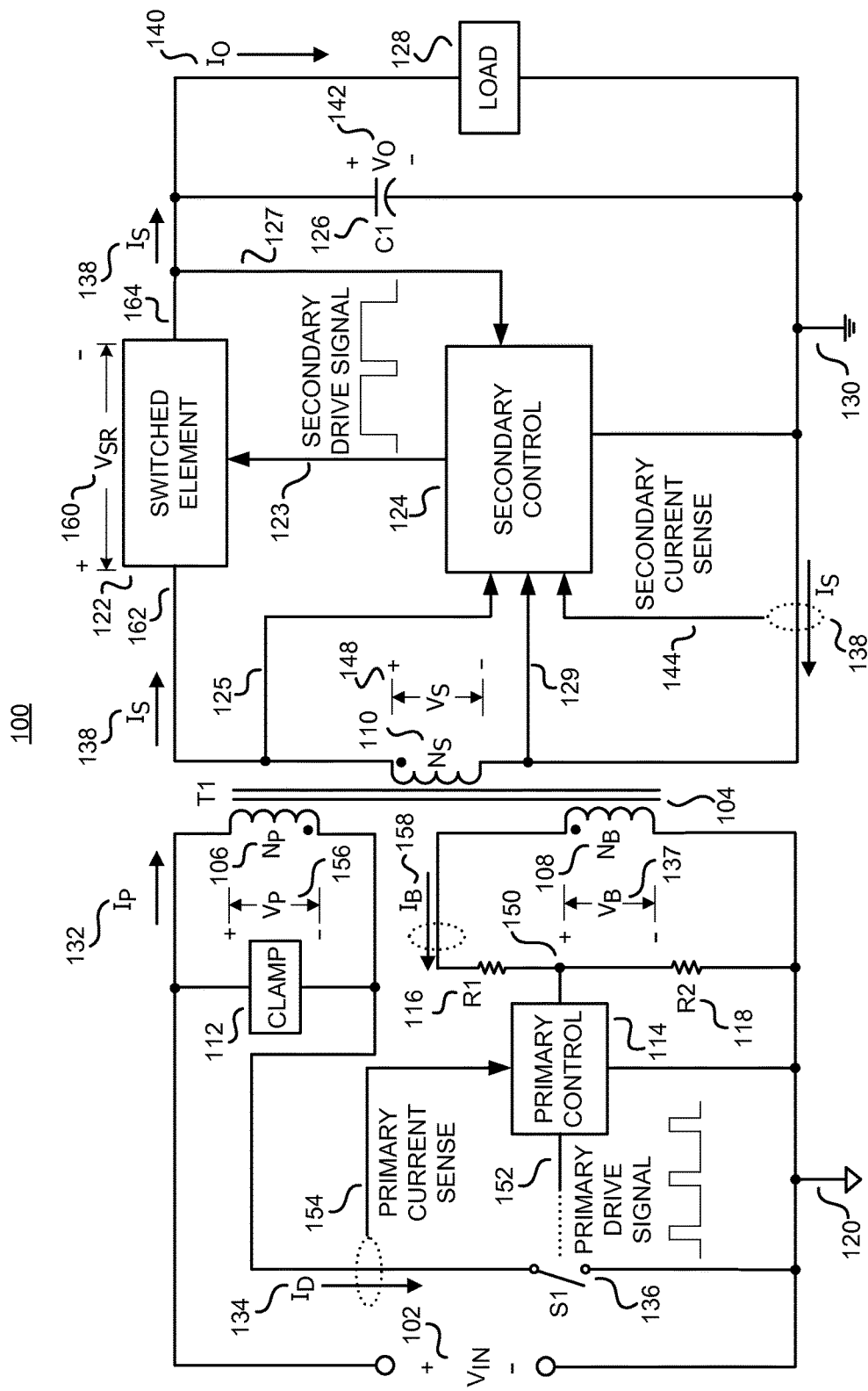
FIG. 1 is a functional block diagram of an example flyback power converter in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a power converter, a controller for a power converter, and a method of operating a power converter and a controller are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In a power converter with galvanic isolation, the input side of the isolation barrier of the power converter is sometimes referred to as the primary side and the output side of the isolation barrier is sometimes referred to as the secondary side. Windings of the energy transfer element that are not galvanically isolated from the primary side are primary side windings, which are also sometimes called primary referenced windings. A winding on the primary side that is coupled to an input voltage and receives energy from the input voltage is sometimes referred to as the primary winding. Other primary referenced windings that deliver energy to circuits on the primary side may have names that describe their principal function, such as for example a bias winding, or for example a sense winding. Windings that are galvanically isolated from the primary side windings are secondary side windings, sometimes called output windings.

A flyback power converter is a type of power converter that may provide galvanic isolation. Galvanic isolation is used for safety to prevent harm to users from electrical contact with the ac power line. In order to provide output regulation, the flyback power converter typically uses a switch on the primary side, often to referred to as a primary switch, and a primary side controller to control the primary switch to turn on or off in response to information about the output. The output may be a voltage, a current, or a combination of the two. Information about the output that the controller uses to regulate the output is generally referred to as feedback. Typically, a flyback converter may have a control algorithm to periodically enable (allow to turn on) and disable (prevent from turning on) the primary switch after a predefined time. The regular predefined period in which the primary switch may be turned on or held off is typically known as a switching period or a switching cycle. A switching cycle in which the primary switch is enabled may be referred to as an enabled switching cycle. Typically, during an enabled switching cycle the primary switch will be turned on and turned off. The switching of the primary switch in a predetermined switching cycle of a flyback converter may be disabled in response to a feedback signal. A switching cycle in which the primary switch is prevented from turning on may sometimes be called as a skipped cycle.

In general, there are two types of sensing schemes referred to as primary-side sensing and secondary-side sensing which may provide the primary side controller with signals required to regulate the output of the power converter. With the secondary-side sensing, the primary controller may be coupled to a galvanically isolated device separate from the energy transfer element such as an optocoupler, to receive feedback information about the output from a sensor coupled directly to the output on the secondary side. In primary-side sensing, the sensor may include a primary-referenced winding on the energy transfer element, typically a bias winding that provides power to primary circuits, which is also used to sense the secondary voltage indirectly to receive feedback information about the output on the secondary side. A cost effective approach to achieve superior regulation of the output at high efficiency may use a primary-referenced switch controller with a secondary-referenced controller that senses the output directly.

The voltages on the windings of transformers and coupled inductors are related by the number of turns on each winding. The number of turns on the primary winding may be referred to as $N_P$ and the number of turns on the secondary winding may be referred to as $N_S$. A voltage applied at the primary winding generates a magnetic flux that couples with the secondary winding to produce a voltage on the secondary winding. The voltage on the secondary winding is directly proportional to the number of turns on the secondary winding and inversely proportional to the number of turns on the primary winding. Thus, the secondary winding voltage is proportional to the primary winding voltage by the turns ratio of the windings.

The secondary winding is typically coupled to the load via a rectifier. The rectifier may be a passive electronic component such as a diode or an active electronic component such as a transistor. An active rectifier which uses a transistor is often referred to as a synchronous rectifier. Use of a synchronous rectifier may raise the efficiency of a power converter because a transistor may drop less voltage than a diode when conducting the same current. Flyback power converters which use synchronous rectifiers on the secondary side often include secondary controllers to turn on the transistor in the synchronous rectifier every time energy is transferred to the secondary winding. In other words, every time there is current in the secondary winding, the secondary controller turns on the transistor in the synchronous rectifier.

As stated before, most primary side control schemes for power converters obtain indirect information about the output voltage. These methods may rely on a relationship between the voltage at a primary side winding and the status of the output of the power converter. A difficulty with this method is that the relationship between the voltage at the primary side winding and the voltage at the output of the power converter is not precisely known. The status of the output sensed by the primary side winding is typically an analog value resulting from the magnetic coupling between the primary side and secondary side windings. Although voltages on primary side windings are approximately proportional to the output voltage of the power converter, many non-ideal effects such as imperfect magnetic coupling and voltage drops across conducting components may lead to inaccurate information about the status of the output voltage. Any control scheme that is based on such type of measurement and sensing of the status of the output may cause the output to deviate from a desired regulated value. As stated before the output may be either a voltage, a current, or a combination of the two. Therefore, the term 'desired regulated value' may be interchangeably used with 'desired regulated voltage' throughout the specification.

As will be discussed, a method and apparatus are disclosed with respect to an example flyback power converter, which provide a manner of obtaining a two-state indication, or in other words, a 'yes or no' indication of whether the output voltage is within a range of desired regulated value. The disclosed method and apparatus avoid problems with imprecise indirect analog measurement. In one of the disclosed embodiments, every time the primary switch turns off and there is a positive current in the secondary winding, a momentary change in a primary side winding voltage may be induced by operating a switched element on the secondary side in response to a secondary controller to alter the impedance of the switched element. The change in the impedance of the switched element on the secondary side induces a momentary change in the secondary voltage while the secondary winding delivers current to the output. This momentary change in the secondary voltage is reflected as a momentary change in the bias winding voltage. The momentary change in the bias winding voltage provides a two-state indication, or in other words, a 'yes or no' indication to the primary controller whether the output is within a range of desired regulated value. In another example, the momentary change in the bias winding voltage may provide an indication about any other quantity which may represent the load condition, such as temperature or output current. In one example, the primary controller may use this information about the output voltage along with a control algorithm to decide whether to turn the primary switch on or to hold the primary switch off for the next switching period or periods. In one example, the primary switch may be enabled (allowed to turn on) or disabled (prevented from turning on) for a portion of a predefined switching period or a switching cycle in accordance with the teachings of the present invention. In yet another example, the primary controller could incrementally adjust any other parameter such as a duty ratio, on-time, off-time, switching frequency, or current limit.

In the example flyback power converter to be discussed, the switched element on the secondary side includes a synchronous rectifier. As will be discussed, inducing a momentary change in secondary voltage is achieved by turning off a transistor in the synchronous rectifier on the secondary side momentarily by a secondary controller when the primary switch turns off and the secondary winding is delivering current to the load.

More specifically, embodiments of the disclosure disclose a way to induce an increase in the voltage at the secondary winding using the secondary controller and observing the induced increase in the voltage at the bias winding in order to indicate to the primary controller if the output voltage is greater than or equal to the desired regulated value.

In the example power converter, the secondary side controller momentarily turns off the transistor in the synchronous rectifier on the secondary side, to force a momentary increase in the bias winding voltage when the output is greater than or equal to the desired regulated value. The primary controller senses this momentary increase in the bias winding voltage as an indication that the output voltage is greater than or equal to the desired regulated value.

In other words, by increasing the bias winding voltage in this way, the primary controller may sense that the output voltage is greater than or equal to the desired regulated value. The disclosed method and apparatus may be implemented as an additional circuitry to generate a precise control signal for the primary switch to be turned on or held off.

As stated before, the illustrated embodiment to be discussed is a flyback power converter with a synchronous rectifier on the secondary side. It is appreciated however, that the embodiments of the disclosure may relate to any power converter topology where there is current in the secondary winding when the primary switch is off.

FIG. 1 is a functional block diagram illustrating one example of a dc-dc power converter 100 that receives an input voltage $V_{IN}$ 102 to produce an output voltage $V_O$ 142 and an output current $I_O$ 140 to a load 128. In an example of an ac-dc power converter, the dc input voltage $V_{IN}$ 102 may be a rectified and filtered ac input voltage. Input voltage $V_{IN}$ 102 is positive with respect to an input return 120. Output voltage $V_O$ 142 is positive with respect to an output return 130. The example power converter 100 of FIG. 1 is a regulated flyback converter. As shown, the power converter 100 includes energy transfer element T1 104, which in a flyback converter is a coupled inductor. A coupled inductor is sometimes referred to as a transformer. From here on throughout the specification the energy transfer element T1 104 may be referred to as a transformer. Energy transfer element T1 104 is illustrated as having three windings, a primary winding 106 with $N_P$ turns, a secondary winding 110 with $N_S$ turns, and a bias winding 108 with $N_B$ turns. The voltages on the windings are related by the number of turns on each winding. Secondary winding 110 of the transformer is galvanically isolated from the primary winding 106 and bias winding 108.

The illustrated converter 100 further includes a primary switch S1 136, a primary control circuit 114, a clamp circuit 112, a first resistor R1 116, a second resistor R2 118, a bias voltage signal 150, a switched element 122, a secondary control circuit 124, and an output capacitor C1 126. Also shown in FIG. 1 are primary voltage $V_P$ 156, primary current $I_P$ 132, a primary current sense signal 154, a primary drive signal 152, a secondary current $I_S$ 138, a secondary voltage $V_S$ 148, secondary voltage sense signals 125 and 129, a secondary drive signal 123, an input 162 of the switched element 122, an output 164 of the switched element 122, a switched element voltage $V_{SR}$ 160, a secondary current sense signal 144, a bias winding voltage $V_B$ 137, a bias winding current $I_B$ 158, a primary switch current $I_D$ 134, an input return 120, and an output return 130.

As shown in the depicted example, the primary switch S1 136 opens and closes in response to the primary drive signal 152 from the primary control circuit 114. In one example, primary switch S1 136 may be a metal oxide semiconductor field effect transistor (MOSFET). In another example, primary switch S1 136 may be a bipolar junction transistor (BJT). In yet another example, primary switch S1 136 may be an insulated gate bipolar transistor (IGBT) or other suitable switch. The primary control circuit 114 and the primary switch S1 136 may be integrated.

In one example, primary control circuit 114 generates the primary drive signal 152 in response to the bias voltage signal 150 to turn the primary switch S1 136 on or to hold it off. The primary switch S1 136 is closed when it is on. The primary switch S1 136 is open when it is off. Primary control circuit 114 may also be responsive to the primary current sense signal 154 which indicates the value of primary switch current $I_D$ 134 in primary switch S1 136. Any of the several ways practiced in the art to sense current in a switch may provide the primary current sense signal 154. In one example, primary drive signal 152 turns primary switch S1 136 off when primary current sense signal 154 reaches a predetermined value.

The example power converter 100 of FIG. 1 also illustrates a clamp circuit 112 which is coupled across the primary winding 106. All of the energy stored by the primary current $I_P$ 132 through primary winding 106 cannot be transferred to other windings because of imperfect magnetic coupling between primary winding 106 and the other windings of the energy transfer element. In the example power converter 100 of FIG. 1, energy that cannot be transferred to other windings is received by the clamp circuit 112. The clamp circuit 112 is coupled across the primary winding 106. The clamp circuit 112 limits the voltage across primary winding 106 to protect the primary switch S1 136 from damage by excessive voltage.

In one example, the primary control circuit 114 controls the switching of the primary switch S1 136 with the primary drive signal 152 in response to a primary current sense signal 154 and a bias voltage signal 150. The bias voltage signal 150 is the bias winding voltage $V_B$ 137 scaled by the resistors R1 116 and R2 118. In the depicted example, primary control circuit 114 controls the switching of the primary switch S1 136 to regulate the output of the power converter to the desired regulated value. The output may be a voltage, a current, or a combination of a voltage and a current. The example power converter 100 of FIG. 1 illustrates the primary control circuit 114 regulating the output voltage $V_O$ 142. The load 128 receives the regulated output voltage $V_O$ 142 and the output current $I_O$ 140. When primary switch S1 136 is closed, the primary voltage $V_P$ 156 is substantially equal to the input voltage $V_{IN}$ 102 and there is primary current $I_P$ 132 in the primary winding 106 of the energy transfer element T1 104, storing energy in the magnetic field of the energy transfer element T1 104. There is substantially no current in secondary winding 110 and in bias winding 108 when primary switch S1 136 is closed. The switched element 122 coupled to secondary winding 110 prevents current in the secondary winding 110 when primary switch S1 136 is closed.

When the primary switch S1 136 is open, the primary voltage $V_P$ 156 is the negative of the reflected secondary voltage $V_S$ 148 on the secondary winding 110 owing to the magnetic coupling between the primary winding 106 and the secondary winding 110. The secondary current $I_S$ 138 in the secondary winding 110 is non-zero once the primary switch S1 136 opens. In the depicted example the resistors R1 116 and R2 118 have relatively high impedance; therefore, current $I_B$ 158 in the bias winding is insubstantial when primary switch S1 136 opens. Thus, a substantial portion of the energy stored in energy transfer element T1 104 may be released through secondary winding 110 after primary switch S1 136 opens. That is, substantially all the energy stored by the primary current $I_P$ 132 in energy transfer element 104 when primary switch S1 136 is closed gets transferred to circuits which receive the secondary current $I_S$ 138 from the secondary winding 110 when the primary switch S1 136 is open. The secondary current $I_S$ 138 minus the output current $I_O$ 140 charges the capacitor C1 126 to produce the output voltage $V_O$ 142. In the example of FIG. 1, capacitor C1 126 has a sufficient capacitance such that the output voltage $V_O$ 142 is substantially a dc voltage.

In the illustrated example, the approximate relationship between the bias winding voltage $V_B$ 137 and voltage $V_S$ 148 is determined by the ratio of the number of turns of the respective windings 108 and 110. That is:

$$\frac{V_B}{V_S} \simeq \frac{N_B}{N_S}$$

As shown in the example illustrated in FIG. 1, power converter 100 further includes a secondary control circuit 124 that operates a switched element 122 to change the voltage $V_S$ 148 on the secondary winding 110 by altering the impedance of the switched element 122, while secondary winding 110 delivers the secondary current $I_S$ 138 to the output in accordance with the teachings of the present invention. In the example shown, the secondary control circuit 124 receives the voltage $V_S$ 148 at secondary winding 110 as secondary voltage sense signals 125 and 129. The secondary control circuit 124 receives the output voltage $V_O$ 142 as signal 127. Secondary control circuit 124 produces a secondary drive signal 123 that controls the switched element 122 to alter the impedance of (and consequently the voltage across) the switched element 122. By changing the impedance, the voltage $V_S$ 148 on the secondary winding 110 is altered momentarily in response to the difference between the desired regulated voltage and the actual value of output voltage $V_O$ 142 when secondary winding 110 delivers the secondary current $I_S$ 138 to the output. The change in the bias winding voltage $V_B$ 137 across the bias winding 108 is observed by primary control circuit 114 after scaling by the resistors R1 116 and R2 118. The primary control circuit 114 controls the primary switch S1 136, in response to the change in the bias winding voltage $V_B$ 137 to control the primary switch S1 136 such that output voltage $V_O$ 142 is regulated to the desired regulated voltage.

Figure 2A:
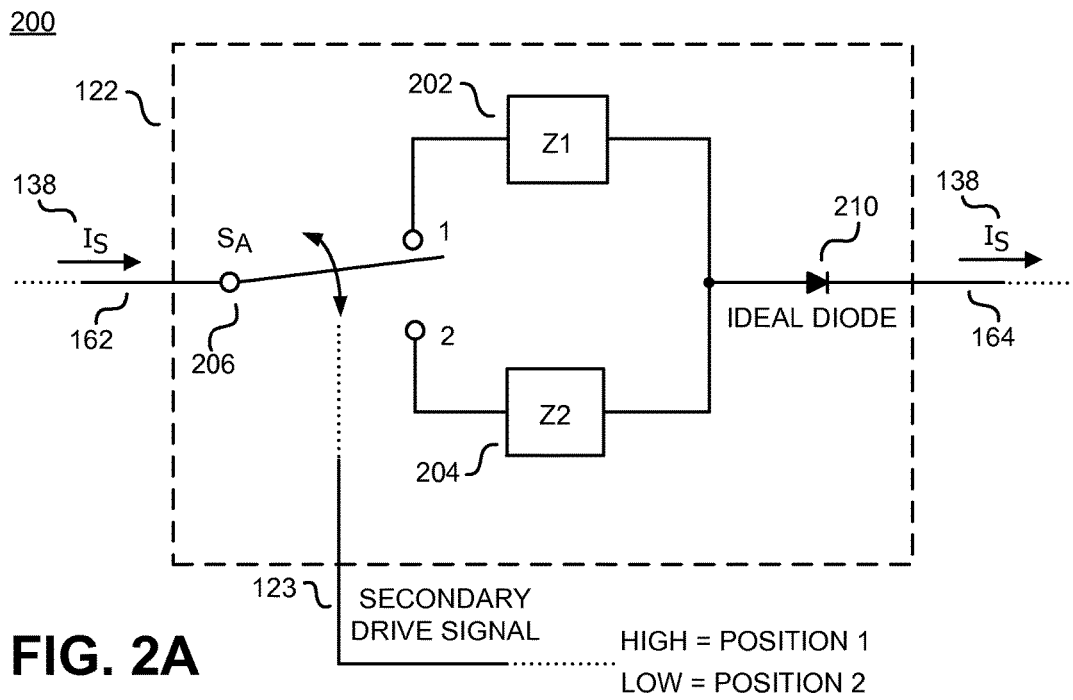
FIGS. 2A and 2B illustrate example representations of a switched element in accordance with the teachings of the present invention.

FIG. 2A illustrates a circuit model 200 of an example of the switched element 122 which includes a single pole double throw (SPDT) switch $S_A$ 206. The SPDT switch $S_A$ 206 may be controlled by the secondary drive signal 123 to be in either position 1 or position 2. The secondary drive signal 123 may have two different values, high or low, to set the position of the switch $S_A$ 206. When the secondary drive signal 123 is high, the switch $S_A$ 206 is in position 1. When the secondary drive signal 123 is low, the switch $S_A$ 206 is in position 2.

FIG. 2A also shows an ideal diode 210. As such, the switched element 122 is a unidirectional switch which may conduct current in only one direction from the input 162 of the switched element 122 to the output 164 of the switched element 122. In other words, the diode 210 prevents the secondary current $I_S$ 138 from becoming negative. In practice, the diode 210 is optional and not required, although it may be realized by any other electronic component that operates to make the switch $S_A$ 206 unidirectional.

When switch $S_A$ 206 is in position 2, current passing between the input 162 and the output 164 of the switched element 122 passes through impedance Z2 204. In addition, when switch $S_A$ 206 is in position 2, the voltage between the input 162 and the output 164 of the switched element 122 is substantially equal to the voltage across the impedance Z2 204. When switch $S_A$ 206 is in position 1, current passing between the input 162 of the output 164 of the switched element 122 passes through impedance Z1 202. Further, when switch $S_A$ 206 is in position 1, the voltage across the switched element 122 between the input 162 and the output 164 of the switched element 122 is substantially equal to the voltage across the impedance Z1 202.

In general, impedances Z1 202 and Z2 204 may be any suitable value including zero, as long as they are different. Thus in the illustrated example, high and low values of the secondary drive signal 123 offer different impedance paths between input 162 and output 164 of the switched element 122. In other words, the impedance of the switched element 122 is made higher or lower by switching between the impedances Z1 202 and Z2 204. For a given current $I_S$ 138 greater than zero, a higher impedance of the switched element 122 causes an increase in the switched element voltage $V_{SR}$ 160, whereas a lower impedance of the switched element 122 causes a decrease in the switched element voltage $V_{SR}$ 160. Thus, a change in the impedance of the switched element 122 may be used to change the switched element voltage $V_{SR}$ 160. Further, the change in the switched element voltage $V_{SR}$ 160 may be used to change the secondary winding voltage $V_S$ 148 in accordance with the teachings of the present invention.

Figure 2B:
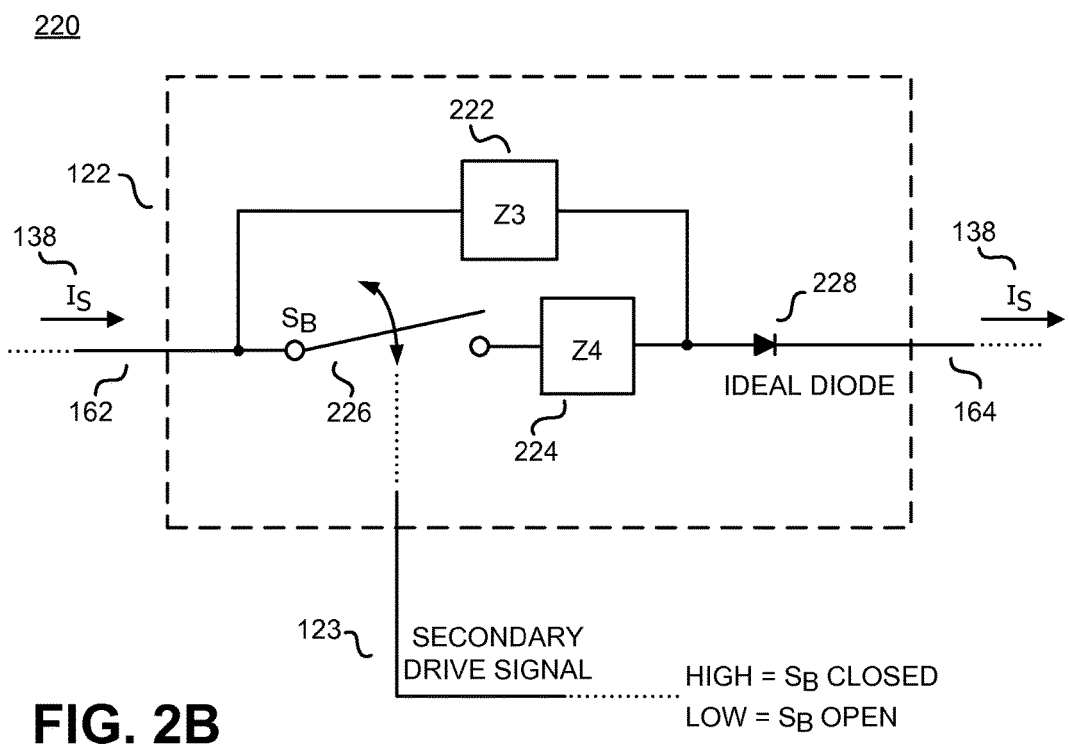

FIG. 2B illustrates a circuit model 220 of another example switched element 122 that includes a single pole single throw (SPST) switch $S_B$ 226. The SPST switch $S_B$ 226 is controlled by secondary drive signal 123 to be either open or closed. When the secondary drive signal 123 is high, the switch $S_B$ 226 is closed. When the secondary drive signal 123 is low, the switch $S_B$ 226 is open. FIG. 2B also includes impedances Z3 222 and Z4 224. One difference between the example switched element 122 shown in FIG. 2A and the example switched element 122 shown in FIG. 2B is that in the example switched element 122 of FIG. 2B, the impedance Z3 222 is between input 162 and output 164 of the switched element 122 whether switch $S_B$ 226 is open or closed. When switch $S_B$ 226 is open, substantially all current passing between input 162 and output 164 of the switched element 122 passes through impedance Z3 222. There is substantially no current passing through impedance Z4 224. When switch $S_B$ 226 is closed, the secondary current $I_S$ 138 passing between input 162 and output 164 of the switched element divides between the impedances Z3 222 and Z4 224.

FIG. 2B also shows an ideal diode 228. As such, the switched element 122 is unidirectional and may conduct current only in one direction from the input 162 to the output 164 of the switched element 122. The diode 228 is optional and is not required. The function of the ideal diode may be realized by any other electronic component that operates to make the switch $S_B$ 226 unidirectional.

In general, impedances Z3 222 and Z4 224 may be any suitable value as long as Z3 222 is not zero. Thus in the illustrated example, high and low values of the secondary drive signal 123 offer higher and lower impedance paths between input 162 and output 164 of the switched element 122. In other words, the impedance of the switched element 122 is made higher or lower by switching between the impedances Z3 222 or Z3 222 in parallel with Z4 224. For a given current $I_S$ 138 greater than zero, a higher impedance of the switched element 122 causes an increase in the switched element voltage $V_{SR}$ 160, whereas, a lower impedance of the switched element 122 causes a decrease in the switched element voltage $V_{SR}$ 160. Thus, a change in the impedance of the switched element 122 may be used to change the switched element voltage $V_{SR}$ 160. The change in the switched element voltage $V_{SR}$ 160 may be used to change the secondary winding voltage $V_S$ 148 in accordance with the teachings of the present invention.

When switch $S_B$ 226 is open, the secondary current $I_S$ 138 passing between input 162 and output 164 of the switched element 122 of the switched element 122 passes through impedance Z3 222. In addition, when switch $S_B$ 226 is open, the voltage between input 162 and output 164 of the switched element 122 is substantially equal to the voltage across the impedance Z3 222. When switch $S_B$ 226 is closed, the secondary current $I_S$ 138 passing between input 162 and output 164 of the switched element 122 passes through the parallel combination of impedances Z3 222 and Z4 224, which is lower than the impedance Z3. Thus with the switch open, the voltage between input 162 and output 164 of the switched element 122 is greater than the voltage when the switch is closed for a given current $I_S$ 138 greater than zero.

In one example, any of the impedances Z1 202, Z2 204, Z3 222, and Z4 224 in FIG. 2A and FIG. 2B may be nonlinear. For example, a PN junction diode may be considered to have a nonlinear impedance.

Figure 3:
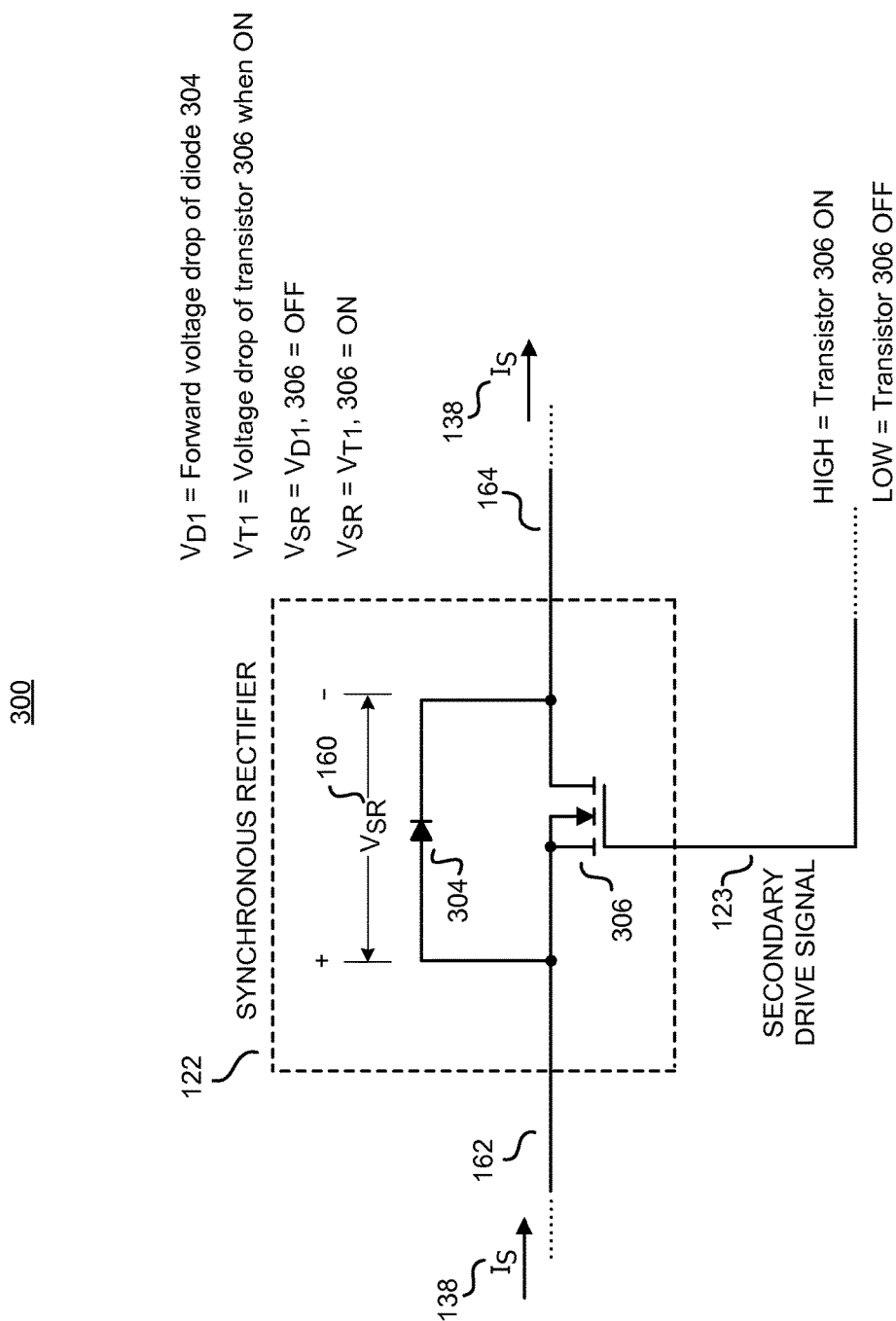
FIG. 3 illustrates a functional block diagram of an example switched element in accordance with the teachings of the present invention.

FIG. 3 shows an example implementation 300 of the switched element 122 in accordance with the teachings of the present invention. The switched element 122 comprises a transistor 306 and a diode 304 configured as a synchronous rectifier in FIG. 3. In one example the diode 304 may represent the internal body diode of transistor 306. In another example, the diode 304 may be external to the transistor 306 and coupled in a direction which is parallel to the internal body diode of transistor 306. The synchronous rectifier 122 is coupled such that diode 304 allows the secondary winding 110 to provide current $I_S$ 138 to the output of power converter 100 of FIG. 1. As stated before, many topologies of switched mode power converters may use synchronous rectifiers on the secondary side. The illustrated embodiment of the invention may be adapted to power converters that already use synchronous rectifiers without much modification and thus provide a cost-effective way of accurate regulation.

The impedances Z1 202 shown in FIG. 2A and Z3 222 shown in FIG. 2B are representatives of the forward characteristics of diode 304 in FIG. 3. The switch $S_B$ 226 in FIG. 2B is representative of the transistor 306 in FIG. 3. In one example, the impedance Z4 224 shown in FIG. 2B is representative of the drain-source ON resistance ($R_{DSON}$) of the transistor 306 in FIG. 3. The $R_{DSON}$ of transistor 306 multiplied by the current through the transistor 306 may be referred to as the transistor voltage drop.

The secondary drive signal 123 controls the switching of the transistor 306. When the secondary drive signal 123 is high with respect to the input 162, the transistor 306 is on and when the secondary drive signal 123 is low with respect to the input 162, the transistor 306 is off.

When the transistor 306 is on, the effective impedance between the input 162 and the output 164 of the switched element 122 is equivalent to the $R_{DSON}$ of the transistor 306 in parallel with the nonlinear forward characteristic of the diode 304. However, as $R_{DSON}$ is much less than the forward resistance of the diode 304, substantially all the current passes through the transistor 306. Therefore, the switched element voltage $V_{SR}$ 160 when the transistor 306 is on is substantially equal to $V_{T1}$, the voltage across the $R_{DSON}$ of the transistor 306 when the secondary current $I_S$ 138 is greater than zero.

When the transistor 306 is off, the effective impedance between the input 162 and the output 164 of the switched element 122 is equivalent to the forward nonlinear characteristic of the diode 304. Therefore, the switched element voltage $V_{SR}$ 160 when the transistor 306 is off is substantially equal to $V_{D1}$, the forward voltage of the diode 304 when the secondary current $I_S$ 138 is greater than zero.

As stated above, in the example power converter 100 of FIG. 1, the switched element 122 switches the positive secondary current $I_S$ 138 between different impedance paths of Z1 202 and Z2 204 as shown in FIG. 2A, or Z3 222 and Z4 224 in parallel with Z3 222 as shown in FIG. 2B. In other words, the switched element 122 switches between a forward nonlinear resistance of diode 304 or the $R_{DSON}$ of the transistor 306 in FIG. 3. The change in the impedance paths changes the switched element voltage $V_{SR}$ 160 to either $V_{T1}$ or $V_{D1}$. The transistor 306 is selected such that the voltage across the transistor 306 when the transistor 306 conducts will be much less than the voltage across the diode 304 when the diode 304 conducts. Thus, when there is current in the switched element 122, the switched element voltage $V_{SR}$ 160 is equal to $V_{T1}$ when transistor 306 is on and the switched element voltage $V_{SR}$ 160 is equal to $V_{D1}$ when the transistor 306 is off and the diode 304 is conducting.

Referring to FIG. 1 and FIG. 3, the voltage across the secondary winding is given by:

$$V_S = V_{SR} + V_O$$

Therefore, the value of secondary voltage $V_S$ 148 increases when transistor 306 is off and the diode is conducting the positive secondary current $I_S$ 138. This increase in the value of secondary voltage $V_S$ 148 is reflected at the bias winding 108.

Figure 4:
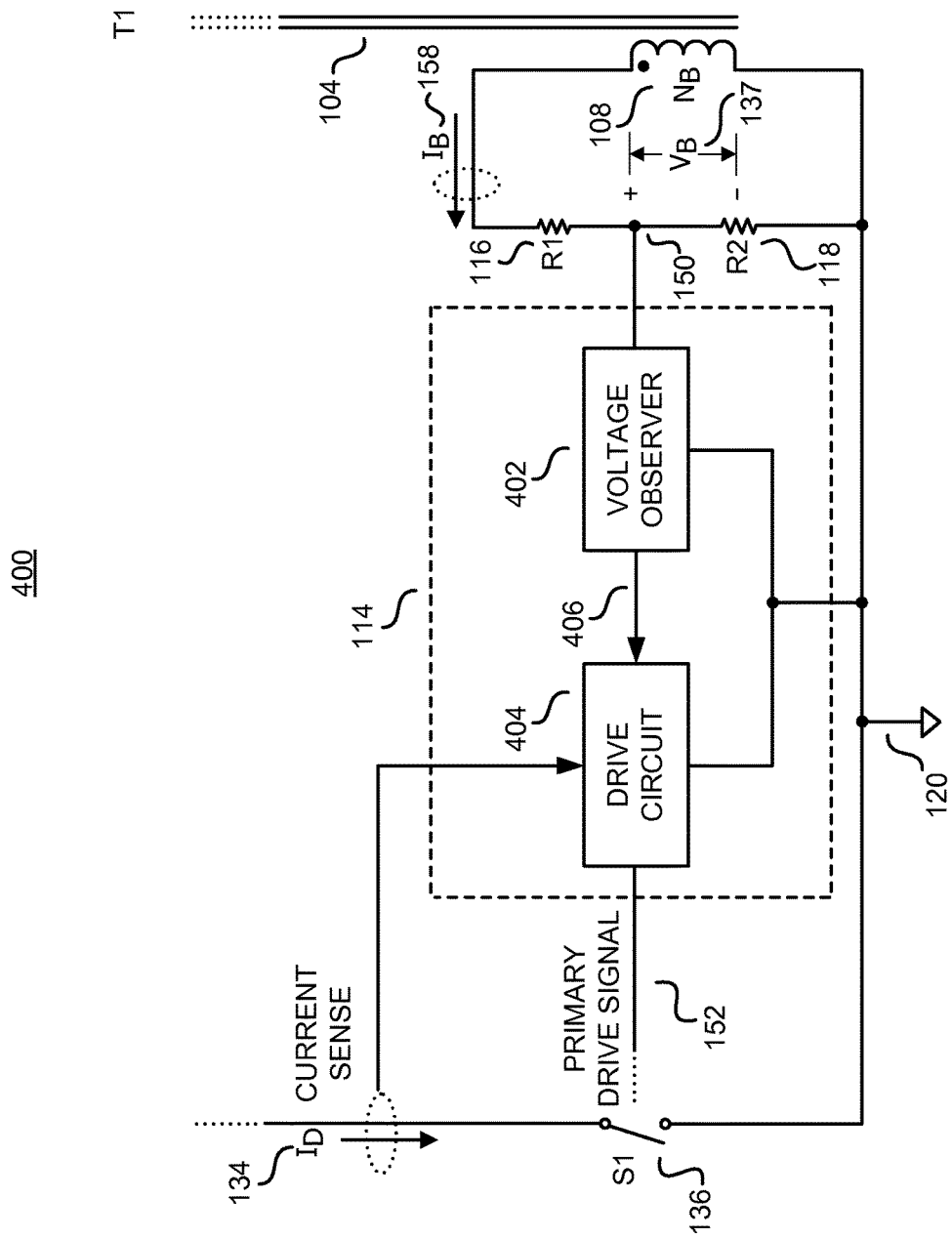
FIG. 4 illustrates a functional block diagram of an example primary controller in accordance with the teachings of the present invention.

FIG. 4 illustrates a functional block diagram 400 of an example primary control circuit 114 of the power converter 100 of FIG. 1 in accordance with the teachings of the present invention. The primary control circuit 114 includes a voltage observer circuit 402 and a drive circuit 404. The voltage observer circuit 402 is coupled to resistors R1 116 and R2 118 that scale the bias winding voltage $V_B$ 137 to a bias voltage signal 150. The output 406 of the voltage observer circuit 402 is coupled to be received by the drive circuit 404. The drive circuit 404 outputs the primary drive signal 152 which controls the turning on and off of the primary switch S1 136. The voltage observer circuit 402 detects a change in the bias winding voltage $V_B$ 137 whenever there is a change in the secondary voltage $V_S$ 148 while the secondary winding 110 is conducting positive current $I_S$ 138. The change in the bias winding voltage $V_B$ 137 may result from the change in the switched element voltage $V_{SR}$ 160. Referring to FIG. 1 and FIG. 4, this momentary change in the bias winding voltage $V_B$ 137 may provide an indication that the output voltage $V_O$ 142 is greater than or equal to a desired regulated voltage. In other words, the momentary change in the bias winding voltage $V_B$ 137 may indicate that the output is regulated. The voltage observer circuit 402 then provides an output 406 to the drive circuit 404 which further either turns the primary switch S1 136 on and off or holds it off in accordance with a control algorithm. Thus, the information about the status of the output voltage $V_O$ 142 may be used to operate the primary switch S1 136 as required to provide the desired output from the power converter.

Figure 5A:
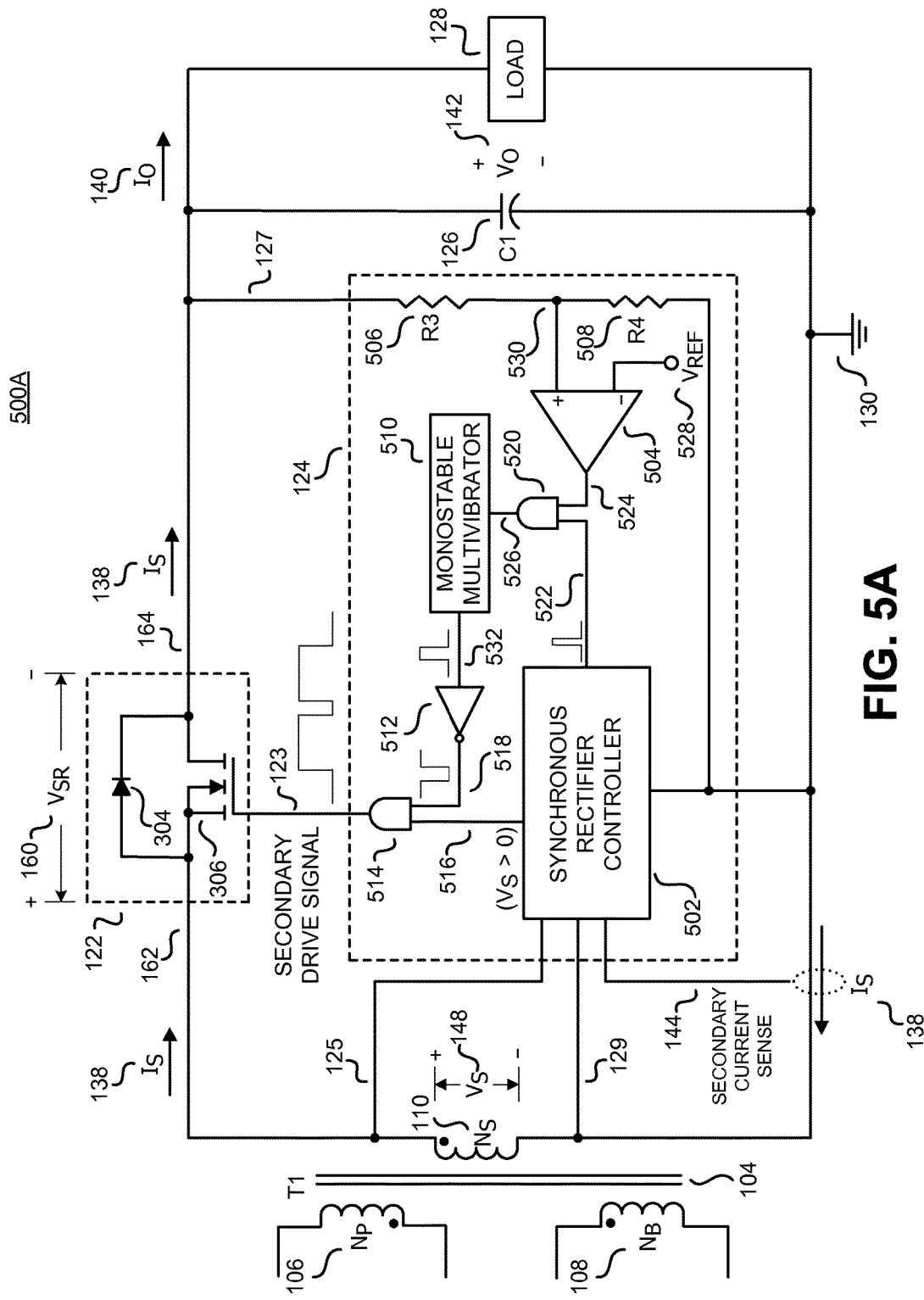
FIG. 5A illustrates a functional block diagram of an example secondary controller in accordance with the teachings of the present invention.

FIG. 5A is a functional block diagram 500A that illustrates details of an example secondary control circuit 124 of the power converter 100 in accordance with the teachings of the present invention. The secondary control circuit 124 includes a synchronous rectifier controller 502, a first two-input AND gate 520, a voltage comparator 504, a monostable multivibrator circuit 510, an inverter 512, a second two-input AND gate 514, and resistors R3 506 and R4 508. An output 522 of the synchronous rectifier controller 502 is coupled to a first input 522 of the AND gate 520. AND gate 520 and monostable multivibrator 510 may be referred to as a pulse generator, while inverter 512 and AND gate 514 may be referred to as secondary logic.

Secondary control circuit 124 is coupled to vary switched element voltage $V_{SR}$ 160 (which generates a voltage pulse across secondary winding 110) in response to an output $V_O$ 142 being at or above a reference value (e.g. a target regulated dc voltage) while secondary current $I_S$ 138 is positive in the secondary winding 110. The synchronous rectifier controller 502 senses when the primary switch S1 136 turns off through the secondary voltage $V_S$ 148 and/or the secondary current $I_S$ 138 and outputs a delayed enable pulse at the output 522 after a predetermined delay. The delayed enable pulse at the output 522 of the synchronous rectifier controller 502, acts as a trigger for the monostable multivibrator circuit 510 when there is a positive current $I_S$ 138 in the secondary winding 110. It is appreciated that the synchronous rectifier controller 502 may be configured to output a multiple number of pulses during a single switching cycle of the power converter 100 of FIG. 1. A second input 524 of the AND gate 520 is coupled to the output of the voltage comparator 504. The output 526 of the AND gate 520 is coupled to the input of the monostable multivibrator circuit 510. The output 532 of the monostable multivibrator circuit 510 is coupled to the input of the inverter 512. Monostable multivibrator 510 generates a disable pulse at output 532 when AND gate 520 receives delayed enable pulse 522 after a delay time and output signal 524 is logic high. In one example, the delay time may provide information about output current, or temperature, or any other quantity which may represent the load condition. In the example power converter 100 of FIG. 1, the delay time may be proportional to the output current. That is, the delay time may be longer for lower output current and shorter for higher output current. In other words, in the example power converter 100 of FIG. 1, the delay time may be longer for lighter loads and shorter for heavier loads. In another embodiment the delay time may be proportional to the temperature of the power converter. That is, the delay time may be longer for lower temperatures and shorter for higher temperatures. In yet another embodiment the delay time" may be proportional to another quantity indicating the load condition. An input of the AND gate 514 is coupled to receive an enable signal 516 output by the synchronous rectifier controller 502. A second input of the AND gate 514 is coupled to the output 518 of the inverter 512. The output of the AND gate 514 is coupled to generate secondary drive signal 123. The inverting input of the voltage comparator 504 is coupled to receive a reference voltage $V_{REF}$ 528 which may be a scaled value of the desired regulated voltage $V_{REG}$. The desired regulated voltage $V_{REG}$ may be proportional to the reference voltage $V_{REF}$ by a factor of K. In the depicted example, the relation between the output voltage $V_O$ 142 and the desired regulated voltage $V_{REG}$ 528 may be given by:

$$V_{REF} = KV_{REG}$$

The value of K may be substantially given by:

$$K = \frac{R4}{R3 + R4}$$

A scaled quantity of the output voltage $V_O$ 142 is coupled to the non-inverting input of the voltage comparator 504 via a signal 530. The signal 530 receives the output voltage $V_O$ 142 which is scaled by the resistors R3 506 and R4 508. In the depicted example, the voltage comparator 504 outputs a logic high if the output voltage $V_O$ 142 is greater than or equal to the desired regulated voltage $V_{REG}$. In one example, when output voltage $V_O$ 142 is greater than or equal to the desired regulated voltage $V_{REG}$, a logic high output of the voltage comparator 504 allows a single delayed enable pulse at the output 522 of the synchronous rectifier controller 502 to trigger the monostable multivibrator 510. In other words, the synchronous rectifier controller 502 outputs a delayed enable pulse 522 to activate the monostable multivibrator 510 when the output of the voltage comparator 504 is at logic high. The monostable multivibrator circuit 510 further generates a single pulse which is inverted using the inverter 512. The synchronous rectifier controller 502 is designed to sense a secondary voltage $V_S$ 148 and $I_S$ 138 greater than zero using a secondary current sense signal 144.

When the primary switch S1 136 turns off, the secondary voltage $V_S$ 148 is positive with respect to the output return 130 and secondary current $I_S$ 138 is greater than zero. The secondary current $I_S$ 138 is in the direction from the secondary winding 110 through the switched element 122 to the load 128. The synchronous rectifier controller may sense when the primary switch S1 136 turns off by sensing a positive secondary voltage $V_S$ 148 and/or a positive secondary current $I_S$ 138. The synchronous rectifier controller 502 is coupled to turn on transistor 306 in the switched element 122 when the primary switch S1 136 turns off. The synchronous rectifier controller 502 outputs the enable signal 516 to turn on transistor 306 in the switched element 122. However, the output of the AND gate 514 has to be at a logic high value with respect to input 162 in order for transistor 306 to be turned on. The AND gate 514 outputs a logic high value when both signals 516 and 518 are logic high. However, the signal 518 is momentarily logic low when the output voltage $V_O$ 142 is greater than the desired regulated voltage $V_{REG}$. As such, the transistor 306 is turned off momentarily when the output voltage $V_O$ 142 is greater than or equal to the desired regulated voltage $V_{REG}$. In other words, the turning on of the transistor 306 is inhibited for a predetermined amount of time (the duration of the disable pulse on output 532) when the scaled output voltage $V_O$ 142 at node 530 is greater than the desired regulated voltage $V_{REG}$. As illustrated later in the depiction of a secondary drive signal 123 in FIG. 6 and FIG. 7, the duration of the disable pulse on output 532 is shorter than the duration of the enable signal 516. In one example, the duration of the disable pulse may provide information about output current, or temperature, or any other quantity which may represent the load condition. In the example power converter 100 of FIG. 1, the duration of the disable pulse may be proportional to the output current that is, the duration of the disable pulse may be longer for lower output current and shorter for higher output current. In other words, in the example power converter 100 of FIG. 1, the duration of the disable pulse may be longer for lighter loads and shorter for heavier loads. In another embodiment the duration of the disable pulse may be proportional to the temperature of the power converter; that is; the duration of the disable pulse may be longer for lower temperatures and shorter for higher temperatures. In yet another embodiment, the duration of the disable pulse may be proportional to another quantity indicating the load condition. In yet another embodiment the combination of delay time and the duration of disable pulse may provide information about output current, or temperature, or any other quantity which may represent the load condition.

Figure 5B:
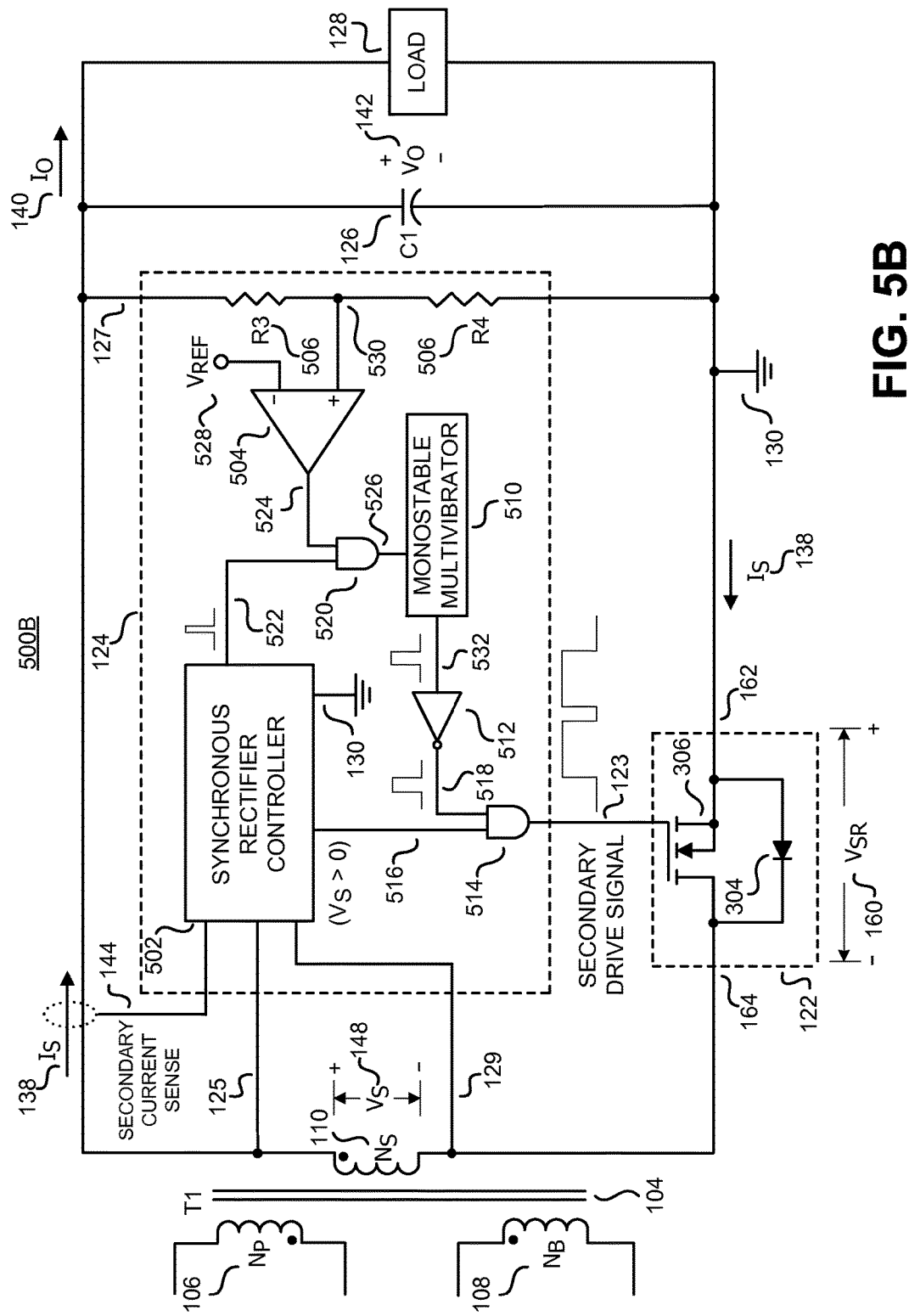
FIG. 5B illustrates a functional block diagram of another example secondary controller in accordance with the teachings of the present invention.

FIG. 5B is a functional block diagram 500B that illustrates details of another example secondary control circuit 124 of the power converter 100 in accordance with the teachings of the present invention. The secondary control circuit 124 of 500B is comprised of the same circuit elements as the secondary control circuit 124 of 500A arranged such that elements of diagram 500A have the same voltages and conduct the same currents as the elements of diagram 500B. Therefore, the secondary control circuit 124 of 500B works substantially in a similar manner as the secondary control circuit 124 of 500A. A difference between the secondary control circuit 124 of 500A and 500B is that in 500B, the input 162 of the switched element 122 is coupled to the output return 130 and the output 164 of the switched element 122 is coupled to the secondary winding $N_S$ 110.

Figure 6:
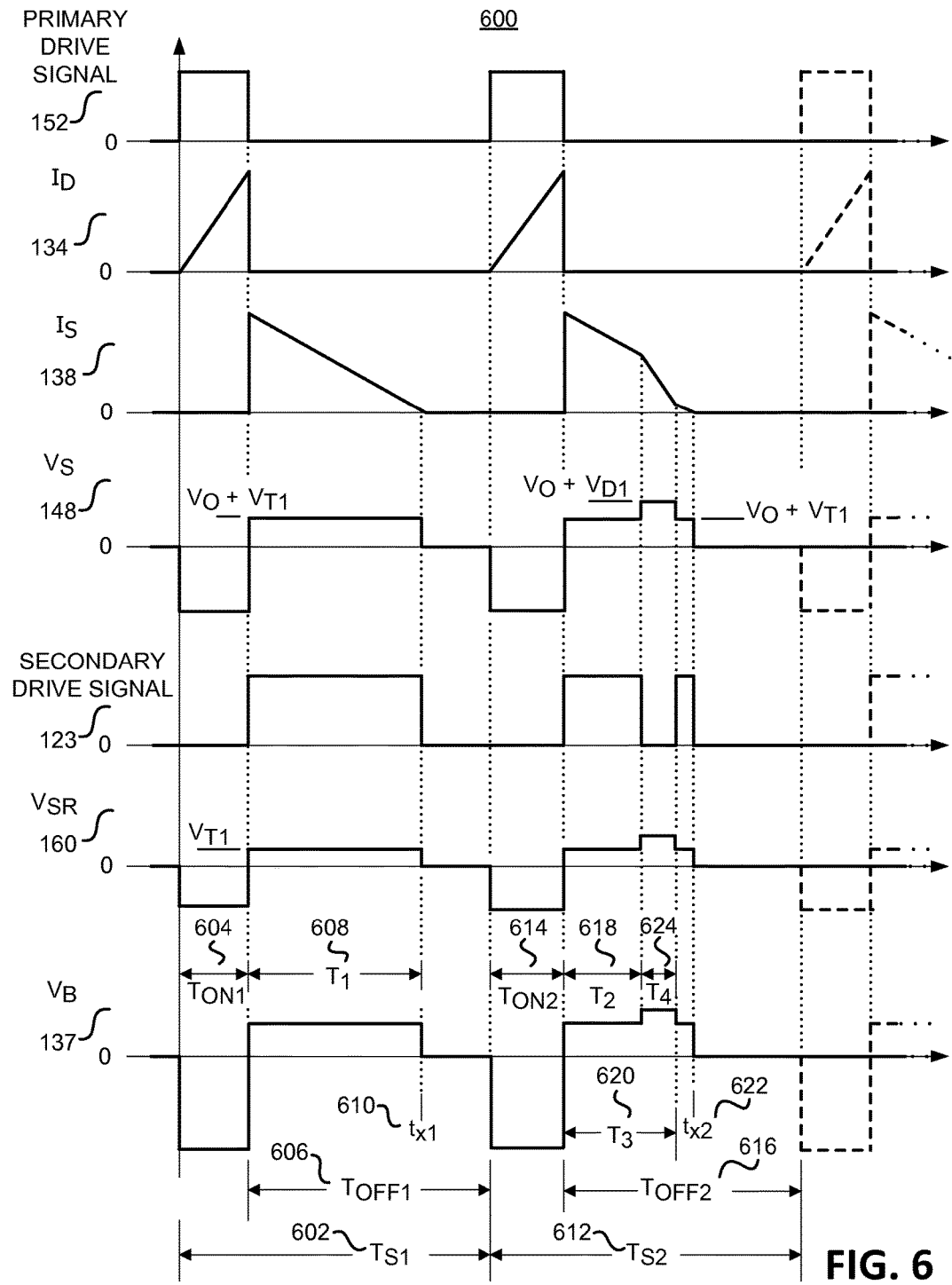
FIG. 6 illustrates a timing diagram of example waveforms of various signals of FIG. 1 when the power converter is operating in discontinuous conduction mode in accordance with the teachings of the present invention.

FIG. 6 is a timing diagram 600 that shows waveforms illustrating operation of the power converter 100 in discontinuous conduction mode (DCM) with the switched element 122 configured as illustrated by either FIG. 5A or FIG. 5B. In a typical DCM operation, the current in the secondary winding may be substantially zero before the primary switch turns on. According to the configuration of the switched element 122 in the depicted example, the synchronous rectifier has the characteristics of FIG. 3 with diode 304 having one value of impedance and transistor 306 having another value of impedance. As stated before, the switched element voltage $V_{SR}$ 160 is $V_{T1}$ and $V_{D1}$ when the secondary drive signal 123 is high and low respectively due to the change in the impedances. The change in the switched element voltage $V_{SR}$ 160 from $V_{T1}$ to $V_{D1}$ is reflected at the bias winding voltage $V_B$ 137.

Two complete switching periods $T_{S1}$ 602 and $T_{S2}$ 612 are illustrated for various waveforms in the timing diagram 600 for the power converter 100 in FIG. 1 operating in DCM. The switching period $T_{S1}$ 602 illustrates the operation of the power converter 100 with only transistor 306 substantially conducting the secondary current $I_S$ 138 in the secondary winding 110, whereas the switching period $T_{S2}$ 612 illustrates the operation of the power converter 100 with the transistor 306 and the diode 304 conducting the secondary current $I_S$ 138 in the secondary winding 110 at different times. During the switching period $T_{S1}$ 602, the output voltage $V_O$ 142 is less than the desired regulated value $V_{REG}$; therefore, the secondary drive signal 123 remains high for the entire time when there is the secondary current $I_S$ 138 in the secondary winding 110. During the switching period $T_{S2}$ 612, the output voltage $V_O$ 142 may be greater than or equal to the desired regulated value $V_{REG}$; therefore, the secondary drive signal 123 becomes low for the interval $T_4$ 624 when there is the secondary current $I_S$ 138 in the secondary winding 110.

The primary drive signal 152 from primary control circuit 114 is high for duration $T_{ON1}$ 604. During $T_{ON1}$ 604 the primary switch S1 136 conducts primary switch current ID 134. During the interval $T_{ON1}$ 604, the primary switch current ID 134 increases until the primary drive signal 152 turns the primary switch S1 136 off at the end of the interval $T_{ON1}$ 604. During the interval $T_{ON1}$ 604, the secondary voltage $V_S$ 148, the bias winding voltage $V_B$ 137, and the switched element voltage $V_{SR}$ 160 are negative. The primary drive signal 152 is low for duration $T_{OFF1}$ 606, preventing the primary switch S1 136 from conducting current. Once the primary switch S1 136 is off, the switched element 122 conducts the secondary current $I_S$ 138 in secondary winding 110. During the interval $T_1$ 608, the secondary voltage $V_S$ 148 and the secondary current $I_S$ 138 are positive. At the beginning of $T_1$ 608, the secondary control circuit 124 makes the secondary drive signal 123 high. The secondary drive signal 123 from secondary control circuit 124 remains high for the duration $T_1$ 608 with transistor 306 substantially conducting the secondary current $I_S$ 138. The switched element voltage $V_{SR}$ 160 is substantially equal to the voltage $V_{T1}$ across the transistor 306. During the interval $T_1$ 608, the current through the diode 304 is substantially zero. It is appreciated that in practice, there may be some leakage current through the diode 304 during the interval $T_1$ 608. During this time, the secondary voltage $V_S$ 148 is substantially equal to the sum of output voltage $V_O$ 142 and the voltage $V_{T1}$ across the transistor 306. The bias winding voltage $V_B$ 137 is substantially proportional to the secondary voltage $V_S$ 148 during the interval $T_1$ 608. The secondary current $I_S$ 138 gradually decreases to zero at the end of $T_1$

608. The rate of decrease of the secondary current $I_S$ 138 is substantially constant throughout the interval $T_{OFF1}$ 606. The secondary current $I_S$ 138 remains zero from the time $t_{X1}$ 610 until the beginning of the next switching period $T_{S2}$ 612. The secondary voltage $V_S$ 148 and bias winding voltage $V_B$ 137 decrease to zero at time $t_{X1}$ 610 and remain zero until the beginning of the next switching period $T_{S2}$ 612.

The primary drive signal 152 becomes high again at the beginning of interval $T_{S2}$ 612 for a duration $T_{ON2}$ 614 allowing the primary switch S1 136 to conduct the primary switch current ID 134. During the interval $T_{ON2}$ 614, all the signals shown in the waveforms of FIG. 6 behave similarly as discussed with respect to the duration $T_{ON1}$ 604 of FIG. 6. At the end of $T_{ON2}$ 614, the primary drive signal 152 becomes low preventing the primary switch S1 136 from conducting the primary switch current $I_D$ 134. At the beginning of $T_2$ 618, the secondary current $I_S$ 138 increases suddenly. During the interval $T_2$ 618, the secondary control circuit 124 makes the secondary drive signal 123 high allowing the transistor 306 to conduct the secondary current $I_S$ 138. During this time, the secondary voltage $V_S$ 148 and the bias winding voltage $V_B$ 137 are positive. The secondary voltage $V_S$ 148 is substantially equal to the sum of the output voltage $V_O$ 142 and the voltage $V_{T1}$ across the transistor 306. The bias winding voltage $V_B$ 137 is substantially proportional to the secondary voltage $V_S$ 148.

During the switching period $T_{S2}$ 612, the output voltage $V_O$ 142 may be greater than or equal to the desired regulated value $V_{REG}$ which is sensed by voltage comparator 504. The output of the voltage comparator 504 then becomes high, thereby allowing delayed enable pulse 522 to trigger the monostable multivibrator 510. The secondary drive signal 123 then becomes low in response to the output of the inverter 518 for the interval $T_4$ 624, turning the transistor 306 off and preventing the transistor 306 from conducting any secondary current $I_S$ 148. During the interval $T_4$ 624, the transistor 306 remains off and the diode 304 substantially conducts the secondary current $I_S$ 138. During this time the switched element voltage $V_{SR}$ 160 is substantially equal to the forward voltage $V_{D1}$ across the diode 304. During this time, the current through the transistor 306 is substantially zero. It is appreciated that in practice, there may be some leakage current through the transistor 306 during the interval $T_4$ 624. At the end of interval $T_2$ 618, there is a sudden increase in the secondary winding voltage $V_S$ 148. During the interval $T_4$ 624, the secondary winding 110 has a secondary voltage $V_S$ 148 substantially equal to the sum of the output voltage $V_O$ 142 and the voltage $V_{D1}$ across the diode 304. The bias winding voltage $V_B$ 137 also increases during the interval $T_4$ 624 as the voltage pulse is reflected onto bias winding 108 from secondary winding 110. From the end of interval $T_3$ 620 until the time $t_{X2}$ 622, the secondary drive signal 123 becomes high again allowing the transistor 306 to substantially conduct the secondary current $I_S$ 148 with the diode 304 conducting substantially zero current; however, there may be some leakage current through the diode 304 from the end of interval $T_3$ 620 until the time $t_{X2}$ 622. From the end of interval $T_3$ 620 until the time $t_{X2}$ 622, the secondary voltage $V_S$ 148 decreases slightly and is substantially equal to the sum of the output voltage $V_O$ 142 and the voltage $V_{T1}$ across the transistor 306.

At time $t_{X2}$ 622 the secondary current $I_S$ 138, the secondary voltage $V_S$ 148, and the bias winding voltage $V_B$ 137 decrease to zero. The secondary current $I_S$ 138 suddenly increases to a non-zero value at the beginning of interval $T_2$ 618 and slowly decreases to zero at the time $t_{X2}$ 622. The rate at which the secondary current $I_S$ 138 decreases varies during the period $T_{OFF2}$ 616 for high and low values of the secondary drive signal 123. This is due to the fact that switched element voltage $V_{SR}$ 160 varies during the period $T_{OFF2}$ 616 for high and low values of the secondary drive signal 123. The secondary current $I_S$ 138 decreases at a first rate for the duration of $T_2$ 618 and from the end of interval $T_3$ 620 until $t_{X2}$ 622 when the transistor 306 is substantially conducting. The secondary current $I_S$ 138 decreases at a second rate that is greater than the first rate during the interval $T_4$ 624, when the diode 304 is substantially conducting. This is because the forward voltage $V_{D1}$ across the diode 304 is greater than the forward voltage $V_{T1}$ across the transistor 306 which causes the switched element voltage $V_{SR}$ 160 to vary during the interval $T_{OFF2}$ 616.

In response to the increase in the bias winding voltage $V_B$ 137 during the interval $T_4$ 624, the primary switch S1 136 may be on or off for the next switching period. In other words, at the end of the switching period $T_{S2}$ 612, the primary drive signal 152 may be high or low as depicted by a dashed line at the end of the switching period $T_{S2}$ 612 in accordance with the control algorithm.

Figure 7:
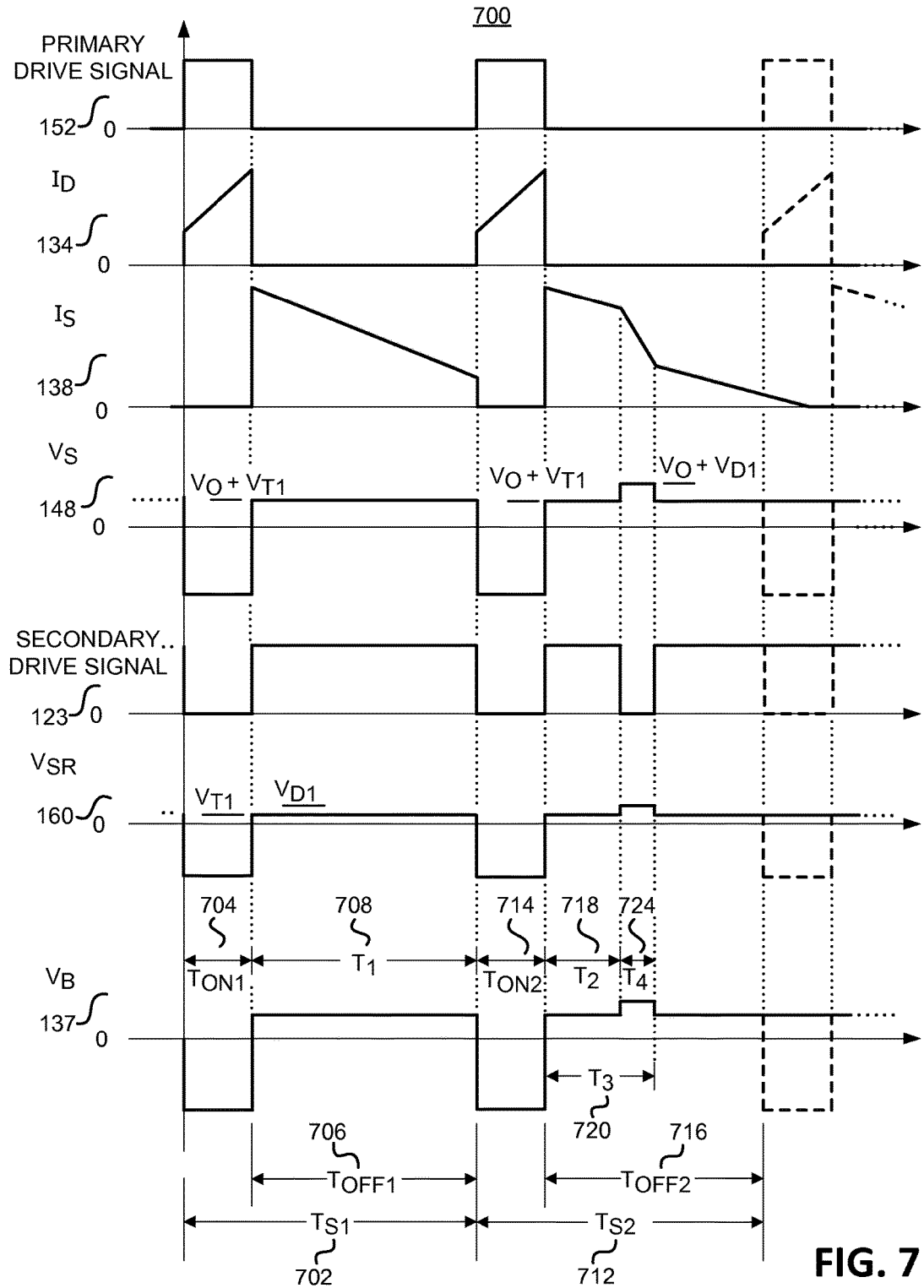
FIG. 7 illustrates a timing diagram of example waveforms of various signals of FIG. 1 when the power converter is operating in continuous conduction mode in accordance with the teachings of the present invention.

FIG. 7 is a timing diagram 700 that shows waveforms illustrating operation of the power converter 100 when it operates in a continuous conduction mode (CCM) with the switched element 122 configured as illustrated by either FIG. 5A or FIG. 5B. In a typical CCM operation, there may be current in the secondary winding when the primary switch turns on. According to the configuration of the switched element 122 in the depicted example, the synchronous rectifier has the characteristics of FIG. 3 with diode 304 having one value of impedance and transistor 306 having another value of impedance. As stated before, the switched element voltage $V_{SR}$ 160 is $V_{T1}$ and $V_{D1}$ when the secondary drive signal 123 is high and low respectively due to the change in the impedances. The change in the switched element voltage $V_{SR}$ 160 from $V_{T1}$ to $V_{D1}$ is reflected at the bias winding voltage $V_B$ 137. One difference between the DCM and CCM is that when the power converter 100 in FIG. 1 operates in CCM, there is energy in energy transfer element T1 104 during the entire time that primary switch S1 136 is open. In other words, there is energy in energy transfer element T1 104 when primary switch S1 136 initially closes. When the power converter 100 in FIG. 1 operates in CCM, the primary switch current $I_D$ 134 in primary switch S1 136 has a value greater than zero immediately after primary switch S1 136 closes.

Two complete switching periods $T_{S1}$ 702 and $T_{S2}$ 712 are illustrated for various waveforms in the timing diagram 700 for the power converter 100 in FIG. 1 operating in CCM. The switching period $T_{S1}$ 702 illustrates the operation of the power converter 100 with only the transistor 306 substantially conducting the secondary current $I_S$ 138 in the secondary winding 110, whereas the switching period $T_{S2}$ 712 illustrates the operation of the power converter 100 with the transistor 306 and the diode 304 conducting the secondary current $I_S$ 138 in the secondary winding 110 at different times. During the switching period $T_{S1}$ 702, the output voltage $V_O$ 142 is less than the desired regulated value $V_{REG}$, therefore, the secondary drive signal 123 remains high for the entire time when there is the secondary current $I_S$ 138 in the secondary winding 110. During the switching period $T_{S2}$ 712, the output voltage $V_O$ 142 may be greater than or equal to the desired regulated value $V_{REG}$, therefore, the secondary drive signal 123 becomes low for the interval $T_4$ 724, when there is secondary current $I_S$ 138 in the secondary winding 110.

The primary drive signal 152 from primary control circuit 114 is high for duration $T_{ON1}$ 704, allowing the primary switch S1 136 to conduct primary switch current $I_D$ 134. During the interval $T_{ON1}$ 704, the primary switch current $I_D$ 134 increases until the primary drive signal 152 turns the primary switch S1 136 off at the end of the interval $T_{ON1}$ 704. During the interval $T_{ON1}$ 704, the secondary voltage $V_S$ 148, the bias winding voltage $V_B$ 137, and the switched element voltage $V_{SR}$ 160 are negative. The primary drive signal 152 is low for duration $T_{OFF1}$ 706, preventing the primary switch S1 136 from conducting primary switch current ID 134 and allowing the switched element 122 to conduct the secondary current $I_S$ 138 in secondary winding 110. During the interval $T_1$ 708, the secondary voltage $V_S$ 148 and the secondary current $I_S$ 138 are positive. At the beginning of $T_1$ 708, the secondary control circuit 124 makes the secondary drive signal 123 high. The secondary drive signal 123 from secondary control circuit 124 remains high for the duration $T_1$ 708 with transistor 306 substantially conducting the secondary current $I_S$ 138. The switched element voltage $V_{SR}$ 160 is substantially equal to the voltage $V_{T1}$ across the transistor 306. During the interval $T_1$ 708 the current through the diode 304 is substantially zero. It is appreciated that in practice, there may be some leakage current through the diode 304 during the interval $T_1$ 708. During this time, the secondary voltage $V_S$ 148 is substantially equal to the sum of output voltage $V_O$ 142 and the voltage $V_{T1}$ across the transistor 306. The bias winding voltage $V_B$ 137 is substantially proportional to the secondary voltage $V_S$ 148 during the interval $T_1$ 708. The secondary current $I_S$ 138 gradually decreases during $T_1$ 708 but may not necessarily reach zero before the beginning of the switching period $T_{S2}$ 712. The rate of decrease of the secondary current $I_S$ 138 is substantially constant throughout the interval $T_{OFF1}$ 706. The secondary voltage $V_S$ 148 and bias winding voltage $V_B$ 137 may not necessarily decrease to zero before the beginning of the next switching period $T_{S2}$ 712.

The primary drive signal 152 becomes high again at the beginning of interval $T_{S2}$ 712 for a duration $T_{ON2}$ 714 allowing the primary switch S1 136 to conduct the primary switch current $I_D$ 134. During the interval $T_{ON2}$ 714, all the signals shown in the waveforms of FIG. 7 behave similarly as discussed with respect to the duration $T_{ON1}$ 704 of FIG. 7. At the end of $T_{ON2}$ 714, the primary drive signal 152 becomes low preventing the primary switch S1 136 from conducting the primary switch current $I_D$ 134. At the beginning of $T_2$ 718, the secondary current $I_S$ 138 increases suddenly. During the interval $T_2$ 718, the secondary control circuit 124 makes the secondary drive signal 123 high allowing the transistor 306 to conduct the secondary current $I_S$ 138. During this time, the secondary voltage $V_S$ 148 and the bias winding voltage $V_B$ 137 are positive. The secondary voltage $V_S$ 148 is substantially equal to the sum of output voltage $V_O$ 142 and the voltage $V_{T1}$ across the transistor 306. The bias winding voltage $V_B$ 137 is substantially proportional to the secondary voltage $V_S$ 148.

During the switching period $T_{S2}$ 712, the output voltage $V_O$ 142 may be greater than or equal to the desired regulated value $V_{REG}$ which is sensed by the voltage comparator 504. The output of the voltage comparator 504 then becomes high, thereby allowing delayed enable pulse 522 to trigger the monostable multivibrator 510. The secondary drive signal 123 then becomes low in response to the output of the inverter 518 for the interval $T_4$ 724, turning the transistor 306 off and preventing the transistor 306 from conducting any secondary current $I_S$ 148. During the interval $T_4$ 724, the transistor 306 remains off and the diode 304 substantially conducts the secondary current $I_S$ 138. During the interval $T_4$ 724, the switched element voltage $V_{SR}$ 160 is substantially equal to the forward voltage $V_{D1}$ across the diode 304 and the current through the transistor 306 is substantially zero. It is appreciated that in practice, there may be some leakage current through the transistor 306 during the interval $T_4$ 724. At the end of interval $T_2$ 718, there is a sudden increase in the secondary winding voltage $V_S$ 148. During the interval $T_4$ 724, the secondary voltage $V_S$ 148 is substantially equal to the sum of the output voltage $V_O$ 142 and the voltage $V_{D1}$ across the diode 304. The bias winding voltage $V_B$ 137 also increases during the interval $T_4$ 724 in response to the sudden increase in the secondary voltage $V_S$ 148. From the end of interval $T_3$ 720 until the end of interval $T_{OFF2}$ 716, the secondary drive signal 123 becomes high again allowing the transistor 306 to substantially conduct the secondary current $I_S$ 148 with the diode 304 conducting substantially zero current, however, it is appreciated that in practice, there may be some leakage current through the diode 304 during this time. From the end of interval $T_3$ 720 until the end of interval $T_{OFF2}$ 716, the secondary voltage $V_S$ 148, decreases slightly and is substantially equal to the sum of the output voltage $V_O$ 142 and the voltage $V_{T1}$ across the transistor 306. At the end of interval $T_{OFF2}$ 716 the secondary current $I_S$ 138, the secondary voltage $V_S$ 148, and the bias winding voltage $V_B$ 137 may be still positive. The secondary current $I_S$ 138 suddenly increases to a non-zero value at the beginning of interval $T_2$ 718 and decreases until the end of interval $T_{OFF2}$ 716. The secondary current $I_S$ 138 may not necessarily decrease to zero before the beginning of the next switching period (immediately following interval $T_{OFF2}$ 716).

The rate at which the secondary current $I_S$ 138 decreases varies during the period $T_{OFF2}$ 716 for high and low values of the secondary drive signal 123. This is due to the fact that switched element voltage $V_{SR}$ 160 varies during the period $T_{OFF2}$ 716 for high and low values of the secondary drive signal 123. The secondary current $I_S$ 138 decreases at a first rate for the duration of $T_2$ 718 and from the end of interval $T_3$ 720 until the end of interval $T_{OFF2}$ 716 when the transistor 306 is substantially conducting. The secondary current $I_S$ 138 decreases at a second rate that is greater than the first rate during the interval $T_4$ 724, when the diode 304 is substantially conducting. This is because the forward voltage $V_{D1}$ across the diode 304 is greater than the forward voltage $V_{T1}$ across the transistor 306 which causes the switched element voltage to vary during the interval $T_{OFF2}$ 716.

In response to the increase in the bias winding voltage $V_B$ 137 during the interval $T_4$ 724, the primary switch S1 136 may be on or off for the next switching period. In other words, at the end of the switching period $T_{S2}$ 712, the primary drive signal 152 may be high or low as depicted by a dashed line at the end of the switching period $T_{S2}$ 712 in accordance with the control algorithm.

It is appreciated, however, when operating in CCM, the current $I_S$ 138 in the secondary winding 110 may not necessarily reduce to zero in all examples when a switching cycle is skipped. It may take several skipped switching cycles before the current $I_S$ 138 in the secondary winding 110 reduces to zero. The example waveforms of FIG. 7 exaggerate the slope of the current $I_S$ 138 in the secondary winding 110 for illustration, but in practice the slope is likely to be much less relative to the peak current when operating in CCM.

It should be noted that in the example power converter 100 of FIG. 1 some switching cycles may be CCM and others may be DCM.

Figure 8:
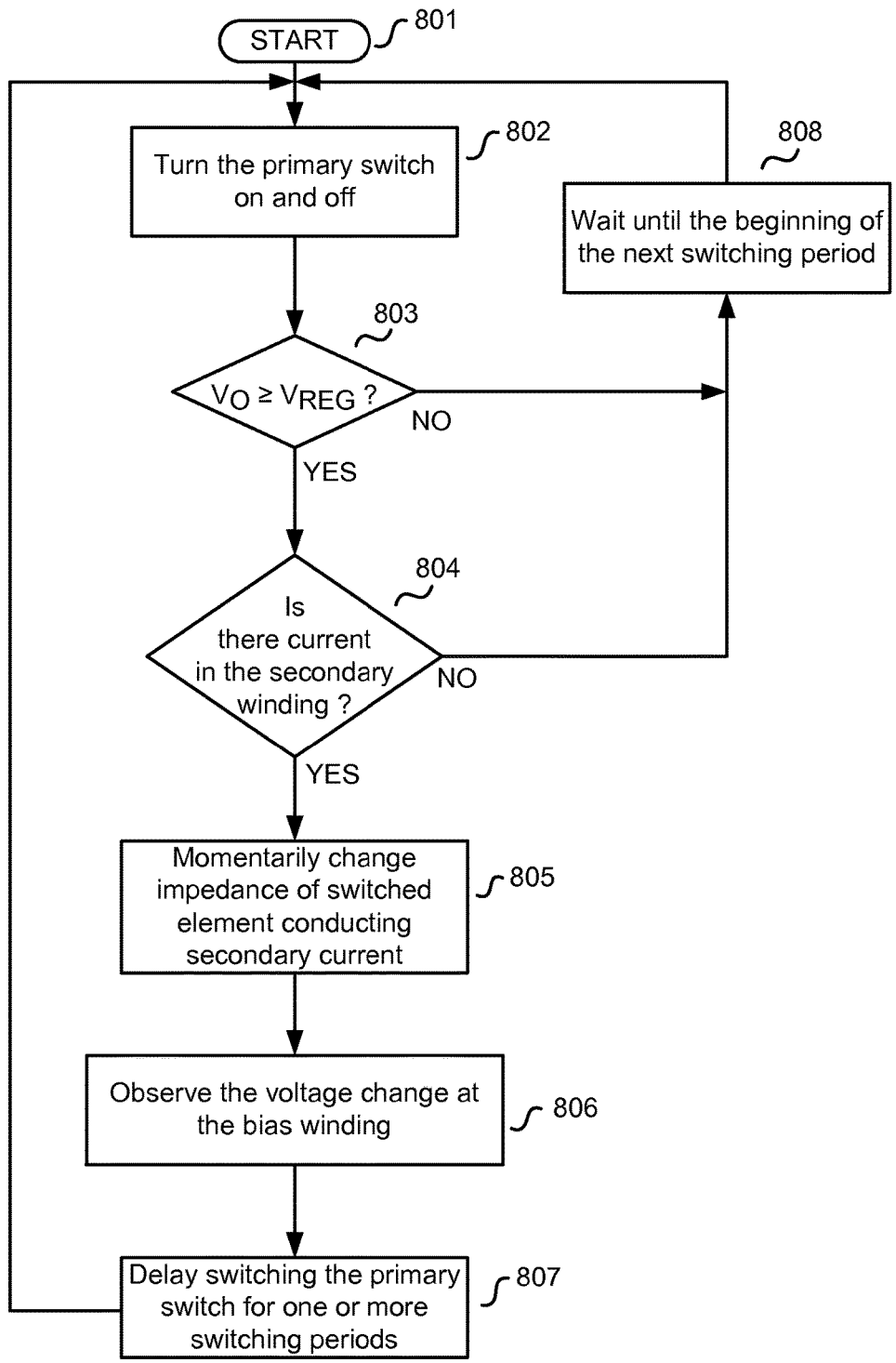
FIG. 8 is a flow diagram that illustrates an example process for regulating the output in accordance with the teachings of the present invention.

FIG. 8 is a flow diagram 800 that illustrates an example process for controlling the primary switch S1 136 by inducing a voltage change at the secondary winding 110 and observing the change in the voltage at the bias winding 108 so that the primary control circuit 114 may observe whether the output voltage $V_O$ 142 is within a desired range. The order in which some or all of the process blocks appear in flow diagram 800 should not be deemed limiting. Rather, one of ordinary skill in the art having the benefit of the present disclosure will understand that some of the process blocks may be executed in a variety of orders not illustrated, or even in parallel.

After starting at block 801, at block 802 the primary switch S1 136 can be turned on and then off. At the end of block 802 the process proceeds to block 803.

At block 803, it can be checked if the output voltage $V_O$ 142 is greater than or equal to the desired regulated voltage $V_{REG}$. If the output voltage $V_O$ 142 is greater than or equal to the desired regulated voltage $V_{REG}$, then the process proceeds to block 804. If output voltage $V_O$ 142 is less than the desired regulated voltage $V_{REG}$, then process 803 will proceed to block 808. At block 808, the process may wait until the beginning of the next switching period. When the next switching period occurs, the process will go back to the beginning of block 802.

At block 804, it can be checked if there is current in the secondary winding 110. If there is current $I_S$ 138 in the secondary winding 110, then the process proceeds to block 805. If there is no current in the secondary winding 110 then the process proceeds to block 808. At block 808, the process may wait until the beginning of the next switching period. When the next switching period occurs, the process will go back to the beginning of block 802.

At block 805, the secondary voltage $V_S$ 148 can be changed by turning off the transistor 306 momentarily to alter the voltage at the secondary winding 110 to induce a voltage change at the bias winding 108 so that the primary control circuit knows whether the output voltage $V_O$ 142 is greater than or equal to the desired regulated value $V_{REG}$. At the end of block 805, the process proceeds to block 806.

At block 806, the voltage change at the secondary winding 110 can be observed at the bias winding 108 by the primary control circuit 114 to know whether the output voltage $V_O$ 142 is greater than or equal to the desired regulated value $V_{REG}$. In the example power converter 100 of FIG. 1, the voltage change at the bias winding 108 can be observed using the voltage observer circuit 402. At the end of block 806, the process proceeds to block 807.

At block 807, the switching of the primary switch S1 136 can be delayed for one or more switching periods based on the control algorithm. In the example power converter 100 of FIG. 1, the primary switch S1 136 can be turned off by controlling the primary drive signal 152.

At the end of block 807, the process goes back to the beginning of block 802 to check if the output voltage $V_O$ 142 is greater than or equal to the desired regulated voltage $V_{REG}$.

Figure 9:
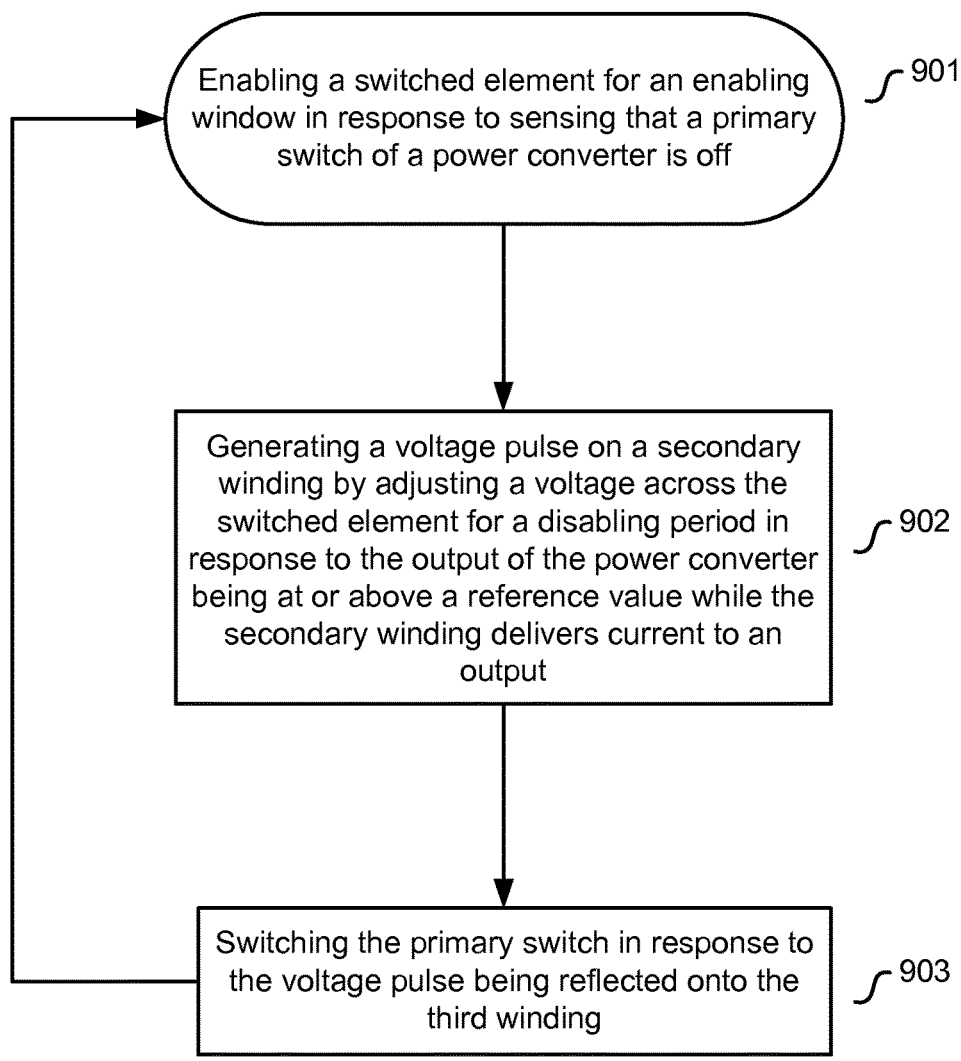
FIG. 9 is a flow diagram that illustrates an example process for regulating a power converter in accordance with the teachings of the present invention.

FIG. 9 is a flow diagram 900 that illustrates an example process for regulating a power converter in accordance with the teachings of the present invention. The order in which some or all of the process blocks appear in flow diagram 900 should not be deemed limiting. Rather, one of ordinary skill in the art having the benefit of the present disclosure will understand that some of the process blocks may be executed in a variety of orders not illustrated, or even in parallel.

At block 901, a switched element (e.g. switched element 122) is enabled for an enabling period (e.g. 602, 702, 612, or 712) in response to sensing that primary switch S1 136 is off. Sensing that primary switch S1 136 is off may be accomplished by sensing the secondary current $I_S$ 138 through secondary winding 110, by sensing the secondary voltage $V_S$ 148 across secondary winding 110, or some combination of the two. At block 902, a voltage pulse on the secondary winding 110 is generated during a disabling period (e.g. voltage increase on $V_S$ 148 during $T_4$ 624/724) in response to the output $V_O$ 142 of the power converter being at or above a reference value. The voltage pulse on the secondary winding 110 is generated by adjusting the voltage $V_{SR}$ 160 across switched element 122 while it conducts current $I_O$ 140 to an output. At block 903, primary switch S1 136 is switched in response to the voltage pulse being reflected onto bias winding 108. Primary controller 114 may skip a switching cycle of primary switch S1 136 in response to sensing the voltage pulse on bias winding 108. The flow may return to process block 901 at the conclusion of process block 903.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A power converter comprising:
an energy transfer element including a first winding, a second winding, and a third winding, wherein the first winding is coupled to an input voltage and the second winding is coupled to an output of the power converter; a switched element coupled to the second winding; a secondary control circuit coupled to generate a voltage pulse across the second winding while the second winding provides current to the output, wherein the secondary control circuit is coupled to vary a voltage across the switched element to generate the voltage pulse across the second winding in response to the output of the power converter being at or above a reference value, wherein the secondary control circuit includes:
a synchronous rectifier controller configured to generate an enable signal and a delayed enable pulse when a primary switch is off; and
a pulse generator coupled to generate a disable pulse at a pulse generator output in response to receiving an output signal and the delayed enable pulse, wherein the disable pulse has a shorter duration than a duration of the enable signal; the primary switch coupled to the first winding; and a primary control circuit coupled to the primary switch and the third winding, the primary control circuit coupled to switch the primary switch to regulate the output of the power converter in response to the voltage pulse, wherein the second winding is coupled to reflect the voltage pulse onto the third winding.

2. The power converter of claim 1, wherein the switched element includes a transistor and the secondary control circuit is coupled to output a secondary drive signal to selectively disable the transistor to increase the voltage across the switched element while the secondary current through the second winding provides current to the output in response to the output of the power converter falling below the reference value.

3. The power converter of claim 2, wherein the switched element also includes a diode coupled in parallel with the transistor, wherein the diode has a forward voltage that is larger than a transistor voltage across the transistor when the transistor is enabled.

4. The power converter of claim 2, wherein the secondary control circuit further includes: a first comparator coupled to generate the output signal on a comparator output when the output of the power converter is above the reference value; the synchronous rectifier controller coupled to sense at least one of a secondary voltage across the second winding and a secondary current through the second winding to determine when the primary switch is off; and
 secondary logic coupled to generate the secondary drive signal in response to the enable signal and the disable pulse, wherein the secondary drive signal disables the transistor when the secondary logic receives the enable signal and the disable pulse, and wherein the secondary drive signal enables the transistor when the secondary logic receives the enable signal and not the disable pulse.

5. The power converter of claim 4, wherein the pulse generator includes:
 an AND gate coupled to receive the delayed enable pulse and the output signal; and
 a monostable multivibrator coupled to generate the disable pulse in response to an output of the AND gate.

6. The power converter of claim 4, wherein the delayed enable pulse is generated after a delay time, and wherein the delay time indicates at least one of an output current or a temperature of the power converter.

7. The power converter of claim 4, wherein the delayed enable pulse is generated after a delay time, and wherein the delay time increases when an output current of the power converter changes in a first direction, and wherein the delay time decreases when the output current changes in a second direction that is opposite the first direction.

8. The power converter of claim 4, wherein a duration of the delayed enable pulse indicates at least one of an output current or a temperature of the power converter.

9. The power converter of claim 4, wherein a duration of the delayed enable pulse increases when an output current of the power converter changes in a first direction, and wherein the duration of the delayed enable pulse decreases when the output current changes in a second direction that is opposite the first direction.

10. The power converter of claim 2, wherein a magnitude of rate of change of the secondary current through the second winding increases when the voltage pulse is across the second winding.

11. The power converter of claim 1, wherein the primary control circuit is coupled to delay switching the primary switch for one or more periods in response to observing the voltage pulse.

12. The power converter of claim 1, wherein the primary control circuit includes voltage sense circuitry coupled to the third winding to observe the voltage pulse.

13. The power converter of claim 1, wherein the second winding of the energy transfer element is galvanically isolated from the first and third windings.

14. The power converter of claim 1, wherein the power converter is a flyback converter topology.

15. The power converter of claim 1, wherein the energy transfer element includes a transformer.

16. The power converter of claim 1, wherein the energy transfer element includes a coupled inductor.

17. A controller for a power converter comprising:
 a synchronous rectifier controller coupled to sense a secondary current through a secondary winding of the power converter, wherein the synchronous rectifier controller is configured to generate an enable signal and a delayed enable pulse when the secondary winding conducts the secondary current;
 a comparator coupled to generate an output signal on a comparator output when an output of the power converter is above a reference value;
 a pulse generator coupled to generate a disable pulse at a pulse generator output in response to receiving the output signal and the delayed enable pulse, wherein the disable pulse has a shorter duration than a duration of the enable signal, wherein the pulse generator includes:
  an AND gate coupled to receive the delayed enable pulse and the output signal; and
  a monostable multivibrator coupled to generate the disable pulse in response to an output of the AND gate; and
 secondary logic to be coupled to a switched element coupled to the secondary winding, wherein the secondary logic is configured to generate a secondary drive signal to vary a voltage across the switched element to create a voltage pulse across the secondary winding.

18. The controller of claim 17, wherein the switched element includes a transistor and the secondary logic is coupled to output the secondary drive signal to selectively disable the transistor to increase the voltage across the switched element while the secondary winding provides current to the output in response to the output of the power converter falling below the reference value.

19. The controller of claim 18, wherein the secondary drive signal disables the transistor when the secondary logic receives the enable signal and the disable pulse, and wherein the secondary drive signal enables the transistor when the secondary logic receives the enable signal and not the disable pulse.

20. The controller of claim 17, wherein the voltage pulse across the secondary winding influences switching of a primary switch coupled to a primary winding inductively coupled to the secondary winding, the secondary drive signal generated in response to receiving the enable signal and the disable pulse.

21. A method of regulating a power converter, comprising:
 enabling a switched element for an enabling window in response to sensing that a primary switch of the power converter is off, wherein the switched element is coupled to a second winding of an energy transfer element that also includes a third winding and a first winding coupled to an input of the power converter, and wherein the primary switch is coupled to the first winding to regulate an output of the power converter;
 generating an enable signal and a delayed enable pulse in response to said sensing that the primary switch is off;
 generating a disable pulse in response to the delayed enable pulse and the output of the power converter being at or above a reference value, wherein the disable pulse has a shorter duration that a duration of the enable signal, wherein a secondary drive signal coupled to control the switched element is generated in response to the enable signal and the disable pulse;

generating a voltage pulse on the second winding by adjusting a voltage across the switched element for a disabling duration in response to the output of the power converter being at or above the reference value, wherein the disabling duration is within the enabling window, and wherein secondary current is provided to the output through the second winding during the enabling window; and switching the primary switch in response to the voltage pulse being reflected onto the third winding, wherein the second winding is coupled to reflect the voltage pulse onto the third winding.

22. The method of claim 21, wherein the switched element includes a transistor and a diode, and wherein enabling the switched element includes enabling the transistor.

23. The method of claim 22, wherein adjusting the voltage across the switched element for the disabling duration includes disabling the transistor for the disabling duration.

24. The method of claim 22, wherein the second winding of the energy transfer element is galvanically isolated from the first and third windings.

25. The method of claim 22, wherein said sensing that the primary switch of the power converter is off includes sensing secondary current through the second winding.

26. The method of claim 25, further comprising:
waiting until a next switching period of the primary switch in response to no secondary current being sensed in the second winding; and
switching the primary switch on and off at the next switching period.

27. The method of claim 22, wherein said sensing that the primary switch of the power converter is off includes sensing a secondary voltage across the second winding.

* * * * *